United States Patent
Fukami et al.

(10) Patent No.: US 7,034,790 B2
(45) Date of Patent: Apr. 25, 2006

(54) LIQUID CRYSTAL DISPLAY DRIVE METHOD AND LIQUID CRYSTAL DISPLAY

(75) Inventors: Tetsuo Fukami, Ishikawa (JP); Katsuhiko Kumagawa, Osaka (JP); Kenji Nakao, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 535 days.

(21) Appl. No.: 10/204,560

(22) PCT Filed: Oct. 24, 2001

(86) PCT No.: PCT/JP01/09315

§ 371 (c)(1),
(2), (4) Date: Aug. 22, 2002

(87) PCT Pub. No.: WO02/35282

PCT Pub. Date: May 2, 2002

(65) Prior Publication Data

US 2003/0011555 A1    Jan. 16, 2003

(30) Foreign Application Priority Data

Oct. 25, 2000    (JP)    ............................... 2000-325299

(51) Int. Cl.
    *G09G 3/36*    (2006.01)

(52) U.S. Cl. ....................................................... 345/94

(58) Field of Classification Search .................. 345/92, 345/94–96, 87, 53; 349/33, 34, 123, 130, 349/191
See application file for complete search history.

(56) References Cited

U.S. PATENT DOCUMENTS 5,296,847 A * 3/1994 Takeda et al. ................. 345/92
5,396,352 A * 3/1995 Kaneko et al. ................ 349/37

(Continued)

FOREIGN PATENT DOCUMENTS

JP    9-101504    4/1997
JP    9-138421    5/1997

(Continued)

*Primary Examiner*—Xiao Wu
*Assistant Examiner*—Kevin M. Nguyen
(74) *Attorney, Agent, or Firm*—McDermott Will & Emery LLP

(57) ABSTRACT

A method of driving a liquid crystal display and the liquid crystal display of the present invention are such that in a liquid crystal display in which video signals are written onto a plurality of pixels frame by frame (Tf), voltages corresponding to the video signals are held in the pixels, and a modulation degree of the liquid crystal layer in an alignment state for display is controlled in accordance with the held voltages, thereby displaying an image, a backward-transition-prevention voltage ΔV for preventing backward transition of a liquid crystal layer is temporalily superposed on the voltages (Vd1–Vdn) corresponding to the video signals in a hold period (Th) of the voltages (Vd1–Vdn) corresponding to the video signals.

62 Claims, 24 Drawing Sheets

U.S. PATENT DOCUMENTS

| | | | |
|---|---|---|---|
| 5,751,381 A * | 5/1998 | Ono et al. | 399/46 |
| 5,844,535 A * | 12/1998 | Itoh et al. | 345/92 |
| 5,883,685 A * | 3/1999 | Mazaki et al. | 349/117 |
| 5,940,059 A * | 8/1999 | Lee et al. | 345/91 |
| 6,040,814 A * | 3/2000 | Murakami et al. | 345/94 |
| 6,115,018 A * | 9/2000 | Okumura et al. | 345/95 |
| 6,256,076 B1 * | 7/2001 | Bae et al. | 349/38 |
| 6,278,502 B1 * | 8/2001 | Colgan et al. | 349/38 |
| 6,384,807 B1 * | 5/2002 | Furuhashi et al. | 345/96 |
| 6,671,009 B1 * | 12/2003 | Hattori et al. | 349/33 |
| 2001/0043184 A1 * | 11/2001 | Kikkawa | 345/92 |

FOREIGN PATENT DOCUMENTS

| | | |
|---|---|---|
| JP | 9-185032 | 7/1997 |
| JP | 2000-19487 | 1/2000 |
| JP | 2000-105575 | 4/2000 |

* cited by examiner (a)

(b)

(c)

(d)

LIQUID CRYSTAL DISPLAY DRIVE METHOD AND LIQUID CRYSTAL DISPLAY

TECHNICAL FIELD

The present invention relates to a method of driving a liquid crystal display and the liquid crystal display. More particularly, the present invention relates to a liquid crystal display using a liquid crystal mode in which transition from an alignment state in a non-display state to an alignment state different from that in the non-display state is carried out, thereby conducting display, and a method of driving the same.

BACKGROUND ART

Liquid crystal displays were first used as displays of notebook personal computers, and currently, they are used as displays of desktop personal computers, portable phones, and the like. Further, in addition to these, in recent years, the liquid crystal displays have been applied to liquid crystal TVs. However, TN (Twisted Nematic) liquid crystal mode commonly used at the present time has many problems associated with moving image display performance for TV uses in terms of a viewing angle, a response speed, and the like.

Accordingly, in recent years, tremendous study effort has been directed toward an OCB (Optically self-Compensated Birefringence) liquid crystal mode as a liquid crystal mode which would take the place of the TN liquid crystal mode. In contrast with the TN liquid crystal mode, the OCB liquid crystal mode could be more suitable for display of a moving image because of its wide viewing angle and fast response. It should be noted that the OCB liquid crystal mode needs to be specially driven before displaying an image. To be specific, in the OCB liquid crystal mode, there are a bend alignment capable of image display (see FIGS. 2(b), 2(c)), and a splay alignment incapable of image display (see FIG. 2(a)). In order to cause the OCB liquid crystal in the splay alignment to transition to the bend alignment (hereinafter this phenomenon is referred to as transition), there is a need for special drive, e.g., application of a high voltage (e.g., about 25V) to a liquid crystal layer during a given time. It should be appreciated that the drive associated with transition is irrelevant to the present invention, and a detailed description will not be further given.

However, the OCB liquid crystal involves a problem of occurrence of a phenomenon (hereinafter referred to as backward transition) in which it cannot maintain the bend alignment and returns to the splay alignment under the condition in which a voltage with a certain level or higher (e.g., about 2.1V) is not applied to the liquid crystal layer for a certain time after it has transitioned from the splay alignment to the bend alignment.

At present, it is only the OCB liquid crystal mode that is adapted to transition to the alignment state different from that in the non-display state (no-voltage application state), and therefore, such a problem arises only in the OCB liquid crystal mode. In the future, if liquid crystal modes adapted to transition to the alignment state different from that in the non-display state for conducting display are developed, then the similar problems would arise in such liquid crystal modes.

DISCLOSURE OF THE INVENTION

It is an object of the present invention to provide a driving method of a liquid crystal display and a liquid crystal display, capable of displaying an image while suppressing occurrence of backward transition in a liquid crystal mode in which transition from an alignment state in a non-display state to an alignment state different from that in the non-display state is carried out, thereby conducting display.

To achieve the above object, in accordance with the present invention, there are provided a driving method of a liquid crystal display and the liquid crystal display, the liquid crystal display including a liquid crystal layer to which a voltage needs to be applied for preventing backward transition from an alignment state for display, to which an alignment state for non-display has transitioned, to the alignment state for non-display, and a plurality of pixels, in which video signals are written onto the plurality of pixels frame by frame, voltages corresponding to the video signals are held in the respective pixels, and a modulation degree of the liquid crystal layer in the alignment state for display is controlled in accordance with the held voltages, thereby displaying an image, and a backward-transition-prevention voltage for preventing backward transition of the liquid crystal layer is superposed on the voltages corresponding to the video signals in a hold period during which the voltages corresponding to the video signals are held. With this constitution, in the liquid crystal display using the liquid crystal mode in which transition from the alignment state in the non-display state to the alignment state different from that in the non-display state is carried out, thereby conducting display, it is possible to display the image while suppressing occurrence of backward transition.

The liquid crystal display may include a display portion with a pair of opposed substrates between which the liquid crystal layer is interposed, one of the substrates being provided with pixel electrodes corresponding to the plurality of pixels on an inner surface thereof and the other of the substrates being provided with counter electrodes on an inner surface thereof, and the voltages corresponding to the video signals may be held by at least liquid crystal capacitors each formed between the pixel electrode and the counter electrode between which the liquid crystal layer is interposed.

The backward-transition-prevention voltage may be superposed on the voltages corresponding to the video signals through control capacitors formed by utilizing the pixel electrodes or conductors connected to the pixel electrodes, independently of the liquid crystal capacitors. With such constitution, the Backward-transition-prevention voltage can be simply superposed on the voltages corresponding to the video signals.

The plurality of pixels may be respectively provided with switching devices which are sequentially turned on or turned off through gate lines, for allowing the video signals to be written onto the respective pixels when the switching devices are turned on and the voltages corresponding to the written video signals to be held in the respective pixels when the switching devices are turned off, the control capacitors may be each formed between the gate line and the pixel electrode, and predetermined voltages may be superposed on the gate lines, thereby superposing the backward-transition-prevention voltage on the voltages corresponding to the video signals through the control capacitors. With such constitution, the backward-transition-prevention voltage can be superposed using the gate lines.

The predetermined voltages superposed on the respective gate lines may have opposite polarities. With such constitution, the influence of voltage coupling to the counter electrodes due to, e.g., polarities of the pixel voltages, can be reduced.

When the backward-transition-prevention voltage is represented by $\Delta Vd$, capacitance of the liquid crystal capacitor is represented by Clc, capacitance of the control capacitor is represented by Cst, and parasitic capacitance of the switching device is represented by Cgd, the predetermined voltages superposed on the gate lines may be given by $(Clc+Cst+Cgd)/Cst \times \Delta Vd$. With such constitution, a desired backward-transition-prevention voltage can be appropriately set.

The plurality of pixels may be arranged in matrix, the gate lines may be formed for respective rows or columns of the plurality of pixels and source lines may be formed for the respective columns or rows of the plurality of pixels, the respective pixels may be connected to the corresponding source lines through the respective switching devices and control terminals of the switching devices are connected to the corresponding gate lines, and the video signals may be supplied to the respective pixels through the source lines according to timings at which the switching devices of the respective pixels are sequentially turned on for the respective gate lines.

The predetermined voltage may be superposed for each gate line.

The predetermined voltage may be superposed for each set of plural gate lines. With such constitution, a configuration of a circuit for driving the gate lines can be simplified.

The plural gate lines may correspond to continuous rows or columns of pixels.

The switching device may be comprised of a thin film transistor.

The switching device may be comprised of diode.

The liquid crystal display may further include common lines, and the control capacitors may be each formed between the common line and the pixel electrode or a conductor connected to the pixel electrode, and the predetermined voltages may be superposed on the common lines, thereby superposing the backward-transition-prevention voltage on the voltages corresponding to the video signals through the control capacitors. With such constitution, the backward-transition-prevention voltage can be simply superposed.

When the backward-transition-prevention voltage is represented by $\Delta Vd$, capacitance of the liquid crystal capacitor is represented by Clc, capacitance of the control capacitor is represented by Cst, and parasitic capacitance of the switching device is represented by Cgd, the predetermined voltages superposed on the gate lines may be given by $(Clc+Cst+Cgd)/Cst \times \Delta Vd$. With such constitution, a desired backward-transition-prevention voltage can be appropriately set.

The common line may be formed for each row or column of the pixels and the predetermined voltage may be superposed for each common line.

The common line may be formed for each row or column of the pixels and the predetermined voltage may be superposed for each set of plural common lines. With such constitution, a configuration of a circuit for driving the common lines can be simplified.

The plural common lines may correspond to continuous rows or columns of pixels.

The liquid crystal display may further include common lines, another control capacitors may be each formed between the common line and the pixel electrode or a conductor connected to the pixel electrode, and another predetermined voltages may be superposed on the common lines, thereby superposing another backward-transition-prevention voltages on the voltages corresponding to the video signals through the another control capacitors. With such constitution, when two backward-transition-prevention voltages at least partially overlap with each other, higher voltages can be superposed on the voltages corresponding to the video signals. Consequently, the backward transition can be effectively prevented when the voltage endurance of the drive circuit of the gate lines or the drive circuit of the common lines is low.

At least one of the backward-transition-prevention voltage and the another backward-transition-prevention voltage may be superposed.

Both of the backward-transition-prevention voltage and the another backward-transition-prevention voltage may be superposed.

When the backward-transition-prevention voltage is represented by $\Delta Vd1$, the another backward-transition-prevention voltage is represented by $\Delta Vd2$, capacitance of the control capacitor is represented by Cst1, and capacitance of the another control capacitor is represented by Cst2, total backward-transition-prevention voltage $\Delta Vd$ superposed on the voltages corresponding to the video signals may be given by:

$\Delta Vd=\Delta Vd1+\Delta Vd2$, the predetermined voltages superposed on the gate lines may be given by $(Clc+Cst1+Cgd)/Cst1 \times \Delta Vd1$, and another predetermined voltages superposed on the common lines are given by $(Clc+Cst2+Cgd)/Cst2 \times \Delta Vd2$. With such constitution, the two backward-transition-prevention voltages can be appropriately set to desired values.

The backward-transition-prevention voltage may be superposed on the voltages corresponding to the video signals by temporality changing potentials of the counter electrodes. With such constitution, the backward-transition-prevention voltage can be simply superposed.

The counter electrode may be formed for each predetermined group of pixels. With such constitution, by controlling the potentials of the counter electrodes for each predetermined group, the backward-transition-prevention voltage can be varied from group to group.

The backward-transition-prevention voltage may be superposed over a superposing period located at a fixed position on time axis in a frame period of the video signal. With such constitution, the backward-transition-prevention voltage can be superposed simultaneously on all the pixels. So, e.g., darkening the display light according to the superposing period can lead to a display image with improved sharpness.

The liquid crystal display may further include an illuminating device for supplying display light for displaying an image by causing transmittance thereof to be changed in accordance with modulation degree of the liquid crystal layer, and the illuminating device may be adapted to reduce a supply amount of the display light according to the superposing period. Since such constitution allows the contrast ratio between the image display period and the superposing period to be improved, an image with improved sharpness is obtained.

The superposing period may be located in a blanking period of the video signal. With such constitution, the backward-transition-prevention voltage can be superposed without interference with image display.

Display of the image may be set in a normally-white mode and a voltage being applied to the liquid crystal layer while the backward-transition-prevention voltage is superposed may be in a range including a black display voltage or greater. With such constitution, when the voltage being applied to the liquid crystal layer exceeds the black display voltage, sharpness of moving images can be improved.

Display of the image may be set in a normally-black mode and a voltage being applied to the liquid crystal layer while the backward-transition-prevention voltage is superposed may be in a range including a white display voltage or greater. Also, with such constitution, when the voltage being applied to the liquid crystal layer exceeds white display voltage, sharpness of moving images can be improved.

The backward-transition-prevention voltage maybe greater than a difference voltage between a minimum value of the voltages corresponding to the video signals and a threshold voltage at which backward transition of the liquid crystal layer takes place. With such constitution, the backward transition of the liquid crystal layer can be reliably prevented.

A period during which the backward-transition-prevention voltage is superposed may account for 10% or more of a frame period of the video signal. With such constitution, satisfactory display image is obtained.

The period during which the backward-transition-prevention voltage is superposed may account for 50% or more of the frame period of the video signal. With such constitution, blurring in moving image can be prevented.

The liquid crystal layer may be made of OCB liquid crystal. With such constitution, in the OCB liquid crystal mode liquid crystal display, the image can be displayed while suppressing occurrence of backward transition.

The above and further objects and features of the invention will more fully be apparent from the following detailed description with accompanying drawings.

BRIEF DESCRIPTION OF THE DRAWINGS

FIG. 2 is a cross-sectional view showing a constitution of a liquid crystal panel and alignment states of a liquid crystal layer in the liquid crystal display of FIG. 1, in which FIG. 2(a) is a view showing an alignment state under no voltage, FIG. 2(b) is a view showing an alignment state under a lower-limit voltage in a display state, and FIG. 2(c) is a view showing an alignment state under an upper-limit voltage in the display state;

FIG. 6 is a view for explaining a backward-transition-prevention voltage, in which FIG. 6(a) is a circuit diagram showing an equivalent circuit in a signal system in a pixel; FIG. 6(b) is a timing chart showing the relationship between a superposed voltage of a gate signal and a voltage superposed on a pixel electrode, FIG. 6(c) is a graph showing change in transmittance of a liquid crystal panel with respect to a liquid crystal application voltage in a normally-white mode; and FIG. 6(d) is a graph showing change in transmittance of the liquid crystal panel with respect to the liquid crystal application voltage in a normally-black mode;

BEST MODE FOR CARRYING OUT THE INVENTION

Hereinafter, embodiments of the present invention will be described with reference to Figures.

Embodiment 1

Figure 1:
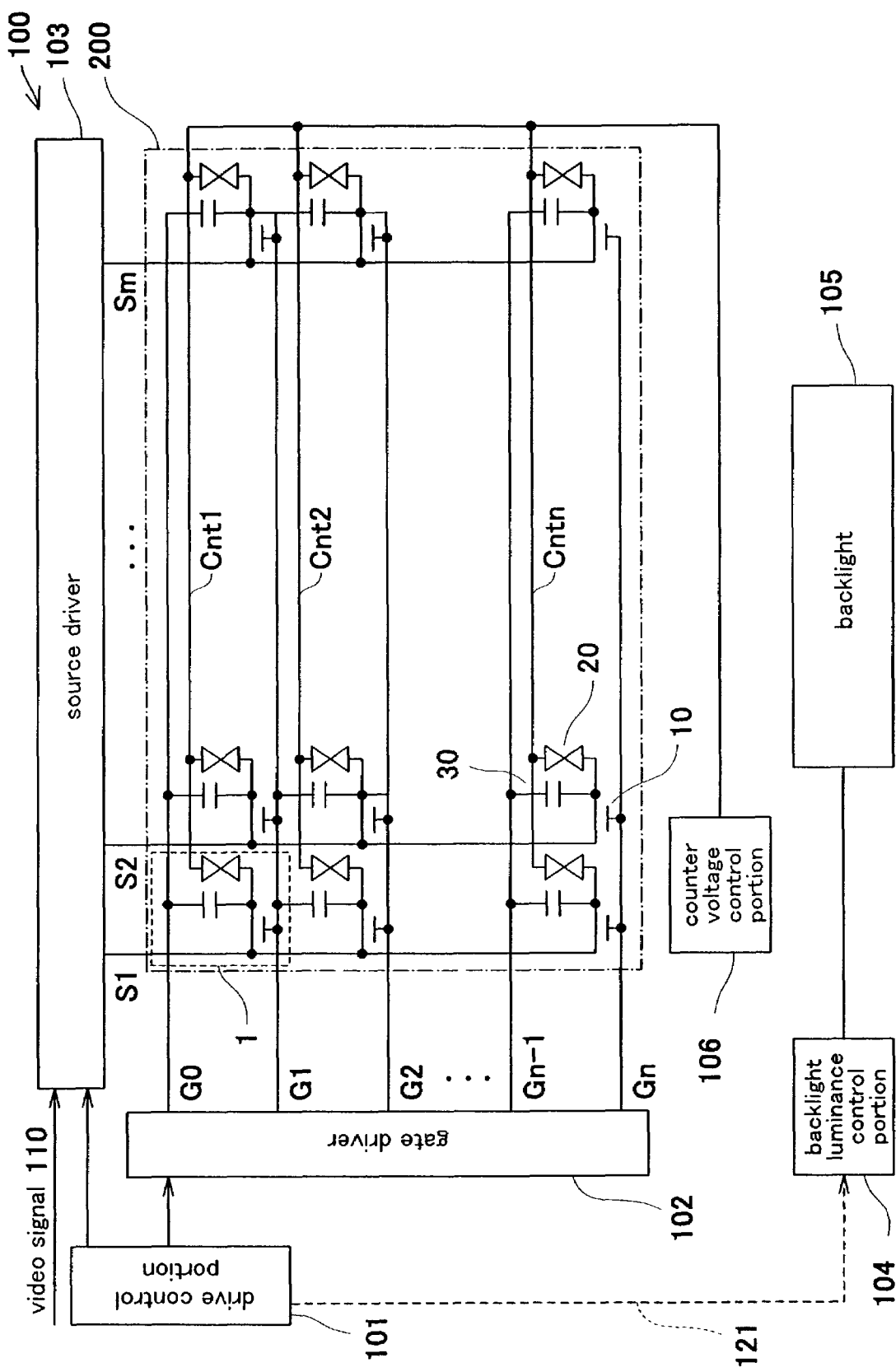
FIG. 1 is a functional block diagram showing a constitution of a liquid crystal display according to a first embodiment of the present invention.
Figure 2:
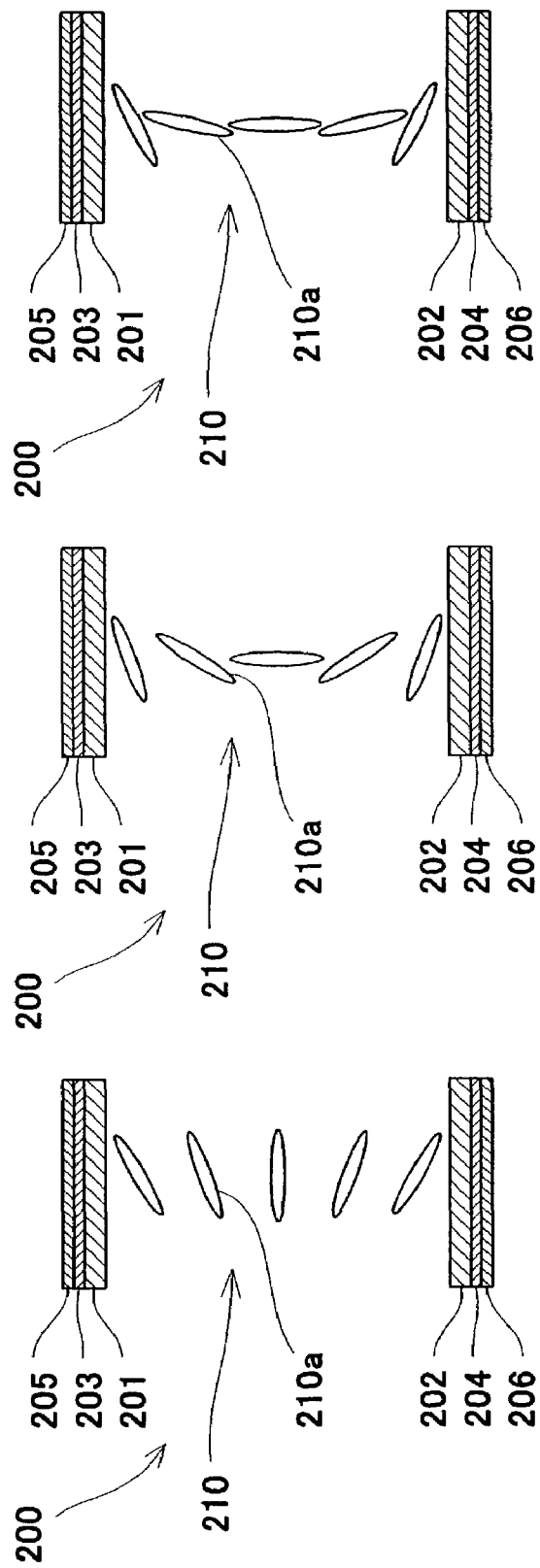
Figure 3:
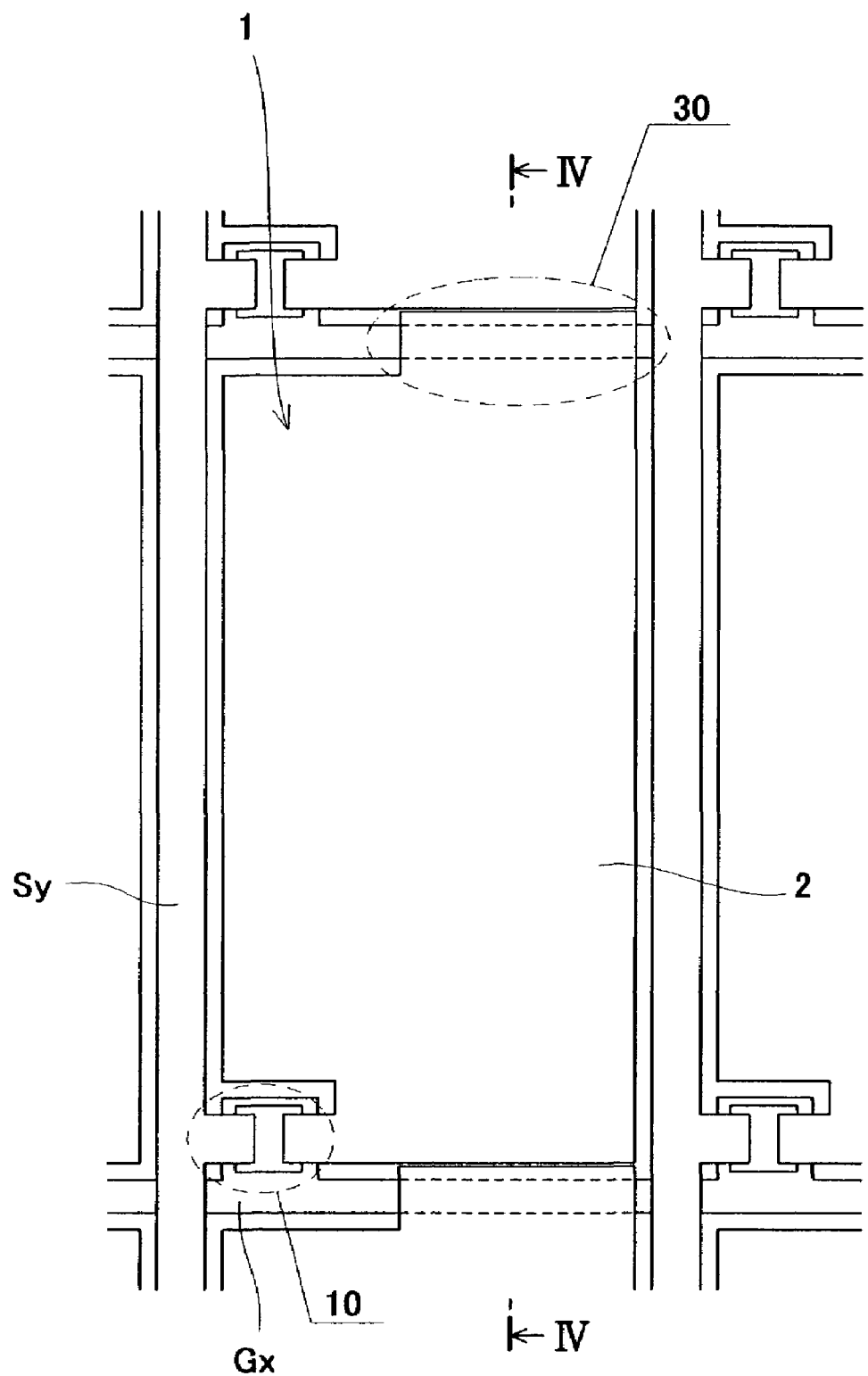
FIG. 3 is a plan view showing the constitution of the liquid crystal panel of the liquid crystal display of FIG. 1.
Figure 4:
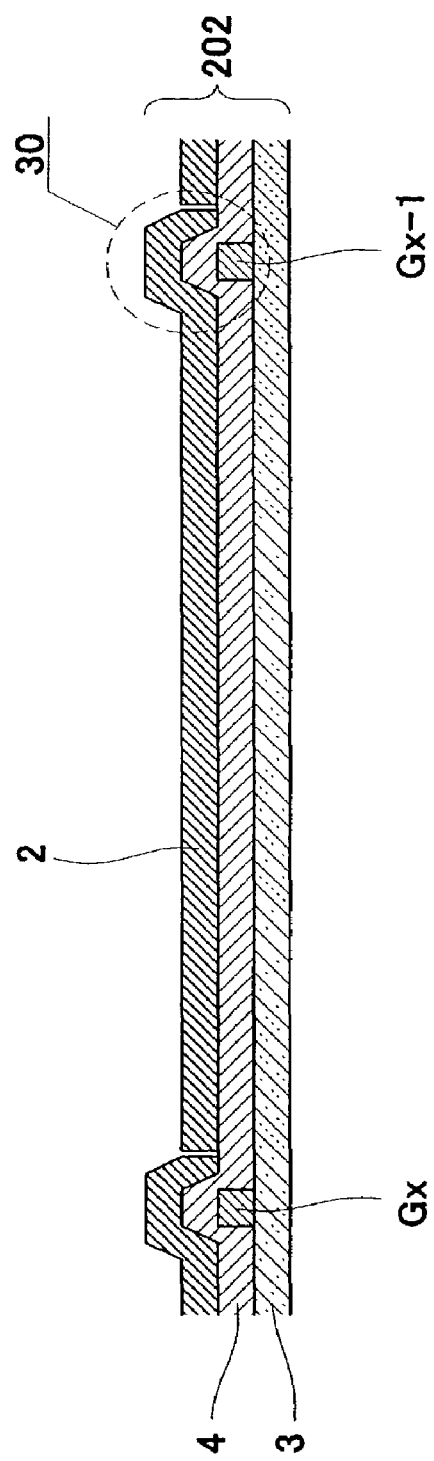
FIG. 4 is a cross-sectional view along line IV—IV of FIG. 3.

FIG. 1 is a functional block diagram showing a constitution of a liquid crystal display according to a first embodiment of the present invention. FIG. 2 is a cross-sectional view showing a constitution of a liquid crystal panel and alignment states of liquid crystal in a liquid crystal display of FIG. 1, in which FIG. 2(a) is a view showing an alignment state under no voltage, FIG. 2(b) is a view showing an alignment state under a lower-limit voltage in a display state, and FIG. 2(c) is a view showing an alignment state under an upper-limit voltage. FIG. 3 is a plan view showing the constitution of the liquid crystal panel in the liquid crystal display of FIG. 1. FIG. 4 is a cross-sectional view along line IV—IV of FIG. 3.

As shown in FIG. 1, a liquid crystal display 100 of this embodiment is comprised of a liquid crystal panel 200 constituting a display portion, a gate driver 102 and a source driver 103 for driving the liquid crystal panel 200, a drive control portion 101 for controlling the gate driver 102 and the source driver 103, a counter voltage control portion 106 for controlling potential of a counter electrode Cntx (mentioned later) of the liquid crystal panel 200, a backlight 105 for supplying display light to the liquid crystal panel 200, a backlight luminance control portion 104 for controlling luminance of the backlight 105, and a transition voltage application circuit (not shown).

With reference to FIG. 1, and FIGS. 2 to 4, the liquid crystal panel 200 is provided with pixels 1 arranged in matrix and the entire pixels 1 arranged in matrix form a display screen. In this embodiment, it is assumed that the pixels 1 are arranged in matrix of n rows and m columns. Arbitrary structural constituents corresponding to the rows and columns of the pixels 1, arbitrary signals or the like, are represented by subscripts x and y. In this case, X and y are in the ranges of $1 \leq x \leq n$, and $1 \leq y \leq m$, respectively.

As shown in FIG. 2, the liquid crystal panel 200 contains a liquid crystal layer 210 between an opposing substrate 201 and a TFT substrate 202, which are disposed opposite to each other. Retardation film 203 and polarizer 205 are provided on outer side of the substrate 201 in this order and retardation film 204 and polarizer 206 are provided on outer side of the substrate 202 in this order.

As schematically shown in FIG. 4, in a cross-sectional view, the TFT substrate 202 is constituted such that a gate line Gx, an insulating layer 4, a pixel electrode 2 and a source line Sy, and an alignment layer (not shown) or the like are disposed in this order on an inner surface of a glass substrate 3, and a TFT (Thin Film Transistor: not shown in FIG. 4) as a switching device is connected to the gate line Gx, the source line Sy, and the pixel electrode 2. As seen in plan views of FIGS. 1, 3, the TFT substrate 202 is structured such that n gate lines G1–Gn and m source lines S1–Sm are arranged to be orthogonal to each other and pixels 1 of n rows and m columns are defined by the gate lines G1–Gn and the source lines S1–Sm. TFTs 10 are each provided in the vicinity of an intersection of the gate line Gx and the source line Sy corresponding to each pixel 1, for every pixel 1. The TFT 10 is constituted such that source, drain, and gate are connected to the source line Sy, the pixel electrode 2, and the gate line Gx, respectively. The pixel electrode 2 partially overlaps with a gate line G x−1 corresponding to the pixel 1 on a preceding row with the insulating layer 4 interposed between them (see FIG. 4) and storage capacitor (control capacitor) 30 is formed in this overlapping portion. Hereinafter, "gateline corresponding to a pixel on a row" is simply referred to as "gate line in a stage". Also, "corresponding to a pixel on a row or a column" is simply referred to as "on a row or a column". The gate lines G0–Gn, the source lines S1–Sm, and counter electrodes Cnt1–Cntn are respectively connected to the gate driver 102, the source driver 103, and the counter voltage control portion 106. It should be noted that the gate line G0 is provided for the purpose of forming storage capacitor mentioned later between the gate line G0 and the pixel electrode 2 on first row.

On the other hand, schematically, the opposing substrate 201 is constituted such that the counter electrodes Cnt1–Cntn (see FIG. 1) and an alignment layer (not shown) are disposed on an inner surface of a glass substrate (not shown). In FIG. 1, n counter electrodes Cnt1–Cntn are drawn like band as corresponding to the rows of the pixel electrodes 2 in the form of matrix in the TFT substrate 202, but in actuality, they are provided over the entire surface of the glass substrate.

Subsequently, an operation (diving method) of the liquid crystal display 100 so constituted will be described.

Referring to FIGS. 1–4, when the liquid crystal display 100 is in a non-operating state, as shown in FIG. 2(a), liquid crystal molecules 210a of the liquid crystal layer 210 has splay alignment. When the liquid crystal display 100 is started, a predetermined voltage (about 25V) is applied to the liquid crystal layer 210 by a transition voltage application circuit (not shown) for a given time, thereby causing the liquid crystal layer 210 to transition to a bend alignment shown in FIGS. 2(b), 2(c). Under a lower-limit voltage in a display state, the liquid crystal molecules 210a of the liquid crystal layer 210 is relatively curved as shown in FIG. 2(b), while under an upper-limit voltage in the display state, the liquid crystal molecules 210a are relatively upright as shown in FIG. 2(c). This embodiment employs a normally-white mode, and therefore, in white display and black display, the liquid crystal molecules 210a are in states of FIGS. 2(b), 2(c), respectively. In the case of normally-black mode, this is reversed. In the bend alignment state, backward transitions to the splay alignment takes place unless a constant voltage (normally, about 2.1V) is applied for a certain time or longer.

After the liquid crystal layer 210 has transitioned to the bend alignment, the gate driver 102 and the source driver 103 operate in the following way under control of the drive control portion 101. During this time, the counter voltage control portion 106 performs control so that potentials of the counter electrodes Cnt1–Cntn have predetermined values and the backlight luminance control portion 104 performs control so that luminance (to be precise, quantity of light) of light supplied from a backlight 105 to the liquid crystal panel 200 has a predetermined value.

Specifically, the gate driver 102 outputs gate signals through the gate lines G1–Gn, thereby sequentially turning ON TFTs 10 of the pixels 1 for the respective gate lines Gx, while the source driver 103 generates source signals based on a video signal 110 and outputs them through the source lines S1–Sm according to timings of the gate signals. This causes the pixel electrodes 2 of the respective pixels 1 to be sequentially charged to have the potentials corresponding to the source signals, the liquid crystal layer 210 to be modulated according to difference voltage (hereinafter referred to as liquid crystal application voltage) between the potential of the pixel electrode 2 and the potential of the counter electrode Cntnx for every pixel 1, and transmittance of the liquid crystal panel 200 with respect to light supplied from the backlight 105 to vary according to modulation degree for every pixel 1. The above operation is repeated frame by frame of the video signal 110, thereby displaying an image according to the video signal 110 on a display screen of the liquid crystal display panel 200. Hereinbelow, the event that the pixel electrode 2 of the pixel 1 is charged to have the potential corresponding to the potential of the source signal is expressed as the event that the source signal is written onto the pixel electrode 2.

Figure 5:
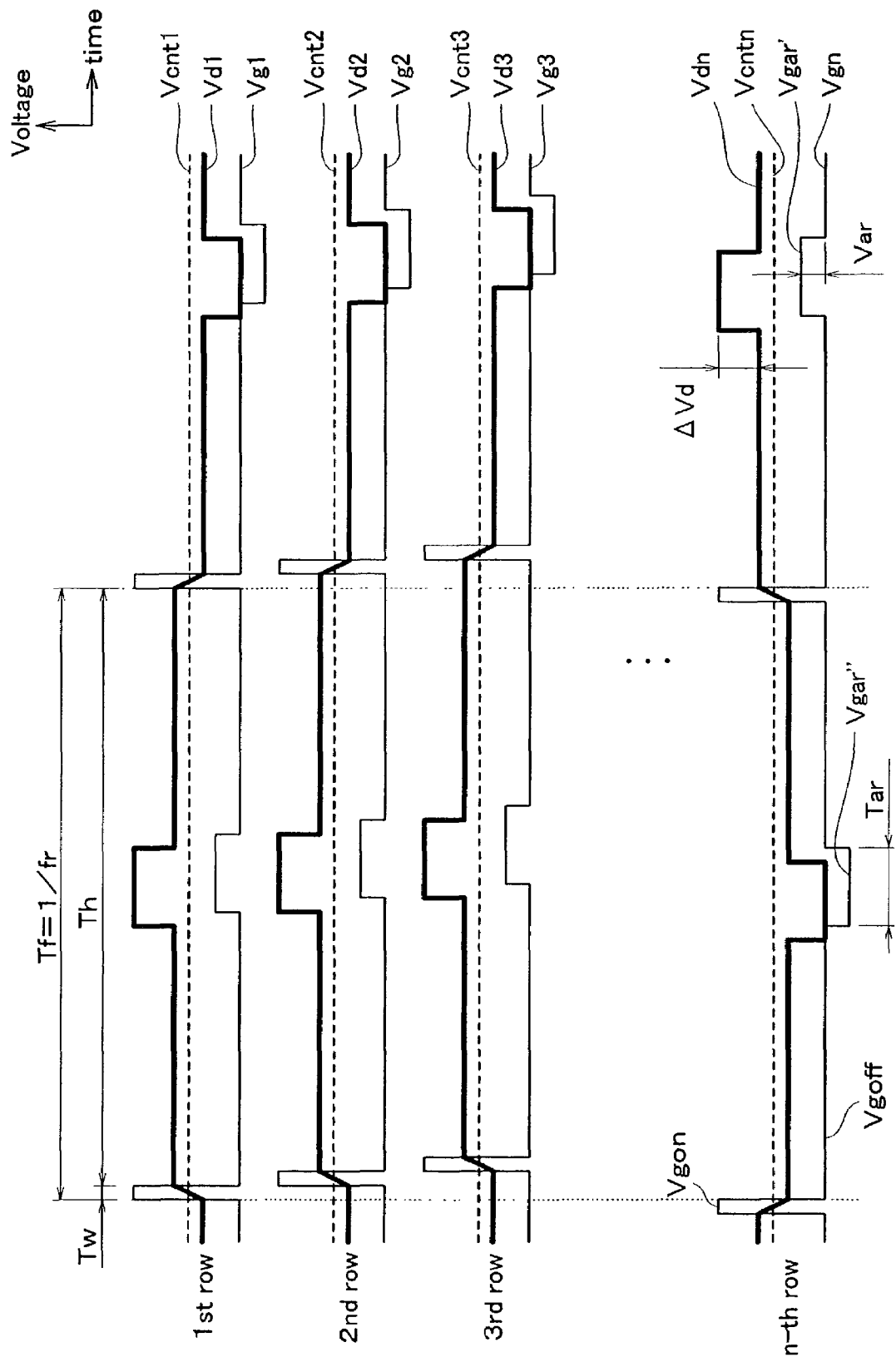
FIG. 5 is a waveform diagram showing change in potentials of gate signals, pixel electrodes, and counter electrodes in the liquid crystal display of FIG. 1.
Figure 6:
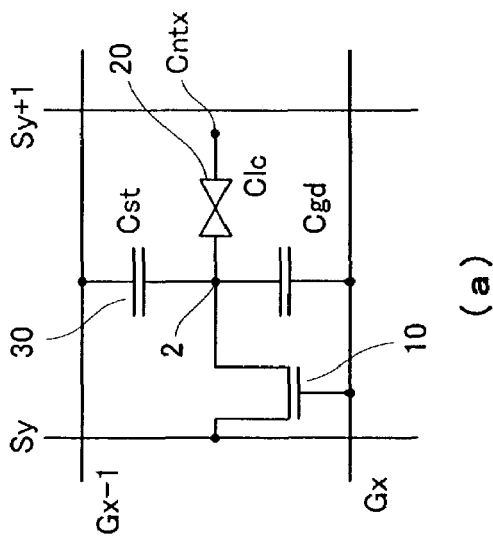
Figure 6:
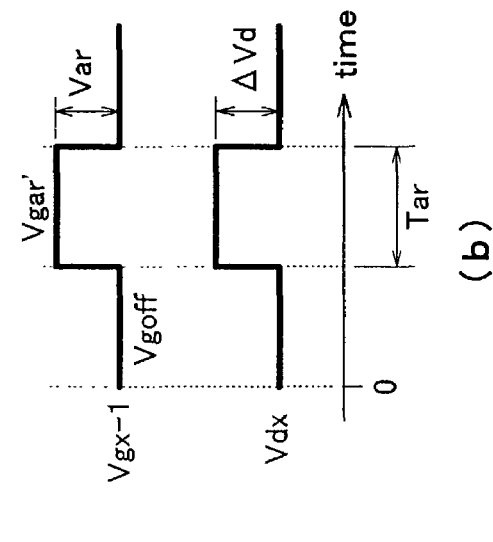
Figure 6:
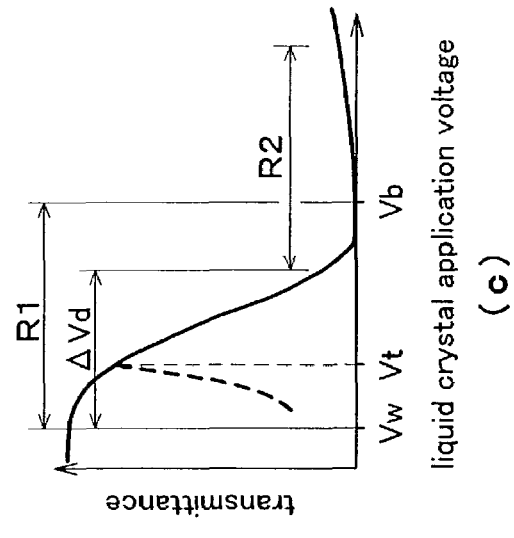
Figure 6:
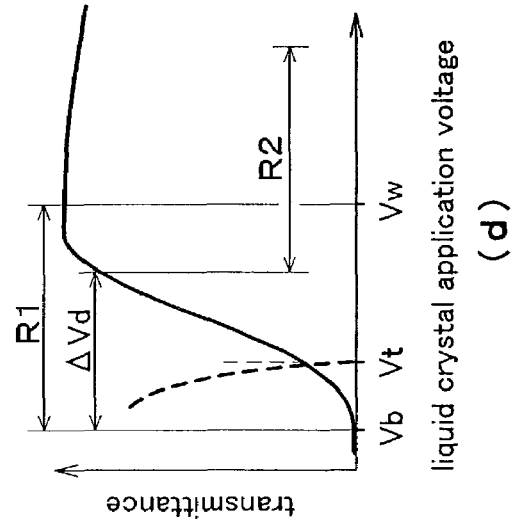

Subsequently, this operation is described in detail with reference to FIGS. 1–6. FIG. 5 is a waveform diagram showing change in potentials of gate signals, pixel electrodes, and counter electrodes in the liquid crystal display of FIG. 1. FIG. 6 is a view for explaining a backward-transition-prevention voltage, in which FIG. 6(*a*) is a circuit diagram showing an equivalent circuit of a signal system in a pixel; FIG. 6(*b*) is a timing chart showing the relationship between a superposed voltage of a gate signal and a voltage superposed on a pixel electrode, FIG. 6(*c*) is a graph showing change in transmittance of a liquid crystal panel with respect to a liquid crystal application voltage in the normally-white mode; and FIG. 6(*d*) is a graph showing change in transmittance of the liquid crystal panel with respect to the liquid crystal application voltage in the normally-black mode.

The gate driver 102 outputs gate signals Vg1–Vgn of FIG. to the gate lines G1–Gn, respectively. A signal identical to the gate signal Vgn is output to the gate line GO. In FIG. 5, Tf denotes a frame period (inverse number of a frame frequency fr) in the video signal 110. The potentials of the counter electrodes Cnt1–Cntn (hereinafter referred to as counter voltages) are set to a predetermined value. The source signals (not shown) are inverted in polarities relative to those of the counter voltages Vcnt1–Vcntn (polarities of difference voltages between the voltages of the source signals and the counter voltages Vcnt1–Vcntn, i.e., the liquid crystal application voltages: hereinafter referred to as polarities of the source signals)for every frame period Tf. Hereinafter, frame periods during which the source signals have positive and negative polarities are called a positive frame period and a negative frame period, respectively.

The gate signals Vg1–Vgn are each comprised of a 4-value signal taking Vgon during write period Tw, Vgar' during superposing period Tar in a positive frame, Vgar" during superposing period Tar in a negative frame, and Vgoff during a period other than the superposing period Tar in a hold period Th. The write period Tw is set to have a length obtained by dividing the frame period Tf into equal parts as many as the n rows of the pixels. The gate signals Vg1–Vgn are set in such a manner that the positions of the corresponding write periods Tw on time axis are each shifted behind by width of the write period Tw from a head of the frame period Tf in ascending order of the rows of the corresponding pixels. The period excepting the write period Tw in the frame period Tf is the hold period Th. The superposing period Tar is set over a predetermined length in the hold period Th. The position of the superposing period Tar on time axis is arbitrary provided that it is within the hold period Th, but is located at substantially the center on time axis in the hold period Th, herein. Meanwhile, the voltage values Vgon and Vgoff of the gate signals Vg1–Vgn are set to values at which the TFTs 10 are turned ON (be in conductive state) and OFF (be in cut-off state), respectively. Hereinafter, Vgon and Vgoff are named gate-on-voltage and gate-off-voltage, respectively. The voltage values Var' and Var" of the gate signals Vg1–Vgn are set higher than the gate-off-voltage Vgoff by superposed voltage Var, and lower than the gate-off-voltage Vgoff by the superposed voltage Var and so as to prevent the TFTs 10 from being turned ON.

As examples of respective voltage waveforms, the maximum value and the minimum value of a pixel voltage Vdx (voltage of the source signal) are +5V and –5V, respectively, the counter voltage Vcntx is 0V, the gate-on-voltage Vgon and the gate-off-voltage Vgoff of the gate signal Vgx are 10V and –10V, respectively, and the superposing voltage Var is 6V. The frame period Tf is set to 16.6 ms and the write period Tw is set to several tens μs. The superposing period Tar is suitably set according to voltage ΔV superposed on the pixel voltage, which will be mentioned later.

Under the setting, when the gate driver 102 outputs the gate signals Vg1–Vgn to the gate lines G1–Gn, the TFTs 10 are sequentially turned ON only during the write period Tw in the order of rows of each column in each frame period Tf. According to the timings of the on-period (write period Tw) of the TFTs 10 in the respective pixels 1, the source driver 103 outputs the source signals for respective columns of the pixels 1. The source signals are written onto the pixel electrodes 2 of the respective pixels 1 during the ON-period of the TFTs 10, and the potentials Vd1–Vdn (hereinafter referred to as a pixel voltage) of the pixel electrodes 2 of the respective pixels 1 become substantially equal to the potentials of the source signals. When the write periods Tw terminate and the TFTs 10 are turned OFF in the respective pixels 1, pixel voltages Vd1–Vdn at the points are held. In general, the source signals, and hence the pixel voltages Vdx have complex shapes depending on a display image, although it is assumed that a constant voltage at which the backward transition could take place is being applied for the sake of simplicity. Further, change in pixel voltage Vdx named "punch-through" occurs according to change of the gate signal Vgx in association with switching of the TFTs 10 in the associated stage, which will not be further described.

Subsequently, a backward-transition-prevention voltage characteristic of the present invention will be described. This is common in all the pixels, and therefore, a pixel will be described. In the case of the pixel 1 on x-th row, when the TFT 10 is turned OFF and then the superposing period Tf comes, the gate signal Vgx–1 in a preceding stage changes by the superposed voltage Var to Var' or Var" (FIG. 6(*b*) shows that it changes to Var'). Thereby, as shown in FIG. 6(*b*), the pixel voltage Vd changes under the influence of change in the gate signal Vgx–1 due to the superposed voltage Var through the storage capacitor 30. The change in the pixel voltage Vdx (hereinafter referred to as a pixel electrode superposed voltage) Δvd is expressed as follows.

As shown in FIG. 6(*a*), in an equivalent circuit in a signal system of the pixel 1, the pixel electrode 2 connected to the source line Sy through the TFT 10 is connected to the counter electrode Cntx and the gate line Gx-1 in preceding stage through a liquid crystal capacitor 20 and a storage capacitor 30, respectively. Also, a parasitic capacitance Cgd exists between the drain of the TFT 10 and the pixel electrode 2 as its extended portion and the gate line Gx in the associated stage. Therefore, when the capacitance of the liquid crystal capacitor 20 and the capacitance of the storage capacitor 30 are represented by Clc and Cst, respectively, the pixel electrode superposed voltage Δvd is given by:

$$\Delta vd = (Cst/(Clc+Cgd+Cst))Var \qquad \text{formula (1)}$$

Examples of these numeric values are: Δvd is 3V, Cst is 0.4–0.5 pF, Clc is 0.4–0.5 pF, Cgd is 0.004–0.05 pF, and Var is 6V as described above.

On the other hand, the relationship between the backward-transition voltage and the voltage during display is shown in FIG. 6(C). Specifically, in the case of the normally-white mode, the transmittance of the display portion decreases with an increase in the liquid crystal application voltage. Therefore, the white display voltage Vw is set as the lower-limit voltage during display and the black display voltage Vb is set as the upper-limit voltage during display. A voltage range R1 from the white display voltage Vw to the black display voltage Vb is a voltage range that the liquid crystal application voltage could take according to the video signal. The backward-transition voltage, i.e., a threshold voltage Vt at which the liquid crystal layer 210 of the OCB mode transitions backward unless the voltage greater than this is applied during a certain period or more exists within the display voltage range R1. Therefore, under only the liquid crystal application voltage written by the video signal, if it is below the backward-transition voltage Vt during a given period or more, backward transition of the liquid crystal layer 210 takes place. In this embodiment, however, the pixel electrode superposed voltage Δvd is superposed on the pixel voltage Vdx and hence, the liquid crystal application voltage. So. by setting the pixel electrode superposed voltage Δvd higher than |Vt–Vw|, the voltage range that the liquid crystal application voltage could take, shifts to a voltage range R2 greater than the backward-transition voltage Vt, thereby preventing the backward transition of the liquid crystal layer 210. It is desirable to set the pixel electrode superposed voltage Δvd to 1V or higher. In this case, it is also desirable that the voltage range R2 include a voltage range exceeding the black display voltage Vb. Under the setting, when the liquid crystal application voltage exceeds the black display voltage Vb, black is displayed on the screen, which leads to improved sharpness of moving images.

As can be seen from FIG. 6(C), when the pixel electrode superposed voltage Δvd is superposed on the pixel voltage Vdx, the transmittance of the liquid crystal panel 200 decreases. Therefore, shorter superposing period Tar is better. Through experiment carried out by inventors of the present invention, it was confirmed that satisfactory image display is attained when the superposing period Tar accounts for 10% or greater of the frame period Tf. Further, when the superposing period Tar accounts for 50% or greater of the frame period Tf, blurring of the moving images can be prevented.

In FIG. 5, the polarity of the superposed voltage Var of the gate signal Vgx is set to coincide with the polarity of the source signal, but can be set suitably according to pixel design or voltage setting and coincidence between them is not always necessary.

In this embodiment, the storage capacitor 30 is of a preceding-gate type, but may be of a subsequent-gate type in which the storage capacitor is formed between the pixel electrode 2 and the gate line Gx+1 in subsequent stage.

While in this embodiment, the superposed voltage Var is applied for each gate line, the superposed voltage Var may be applied for each set of plural adjacent or apart gate lines. In other words, the superposed voltage Var may be applied at timings varying for each set of plural gate lines rather than applied at timings varying for each gate line. In this case, it is desirable that the positive and negative polarities of all the applied superposed voltages Var should be substantially equal in number. This is because, preferably, all the polarities of the superposed voltages Var are not equal depending on the polarity of the pixel voltage for the purpose of eliminating the effect of voltage coupling to the counter electrode.

The normally-white mode of this embodiment may be replaced by the normally-black mode. In this case, as shown in FIG. 6(d), the relationship between the white display voltage Vw and the black display voltage Vs is reversed but the other respects are similarly to those of the normally-white mode.

As should be appreciated from the foregoing, in accordance with the liquid crystal display and the driving method of the same of this embodiment, the pixel electrode superposed voltage ΔV is temporalily superposed on the pixel voltage during the hold period in the pixel, thus preventing the backward transition of the OCB liquid crystal. Hereinafter, the voltage for preventing the backward transition of the liquid crystal layer 210 such as the pixel electrode superposed voltage ΔV is named backward-transition-prevention voltage.

Embodiment 2

Figure 7:
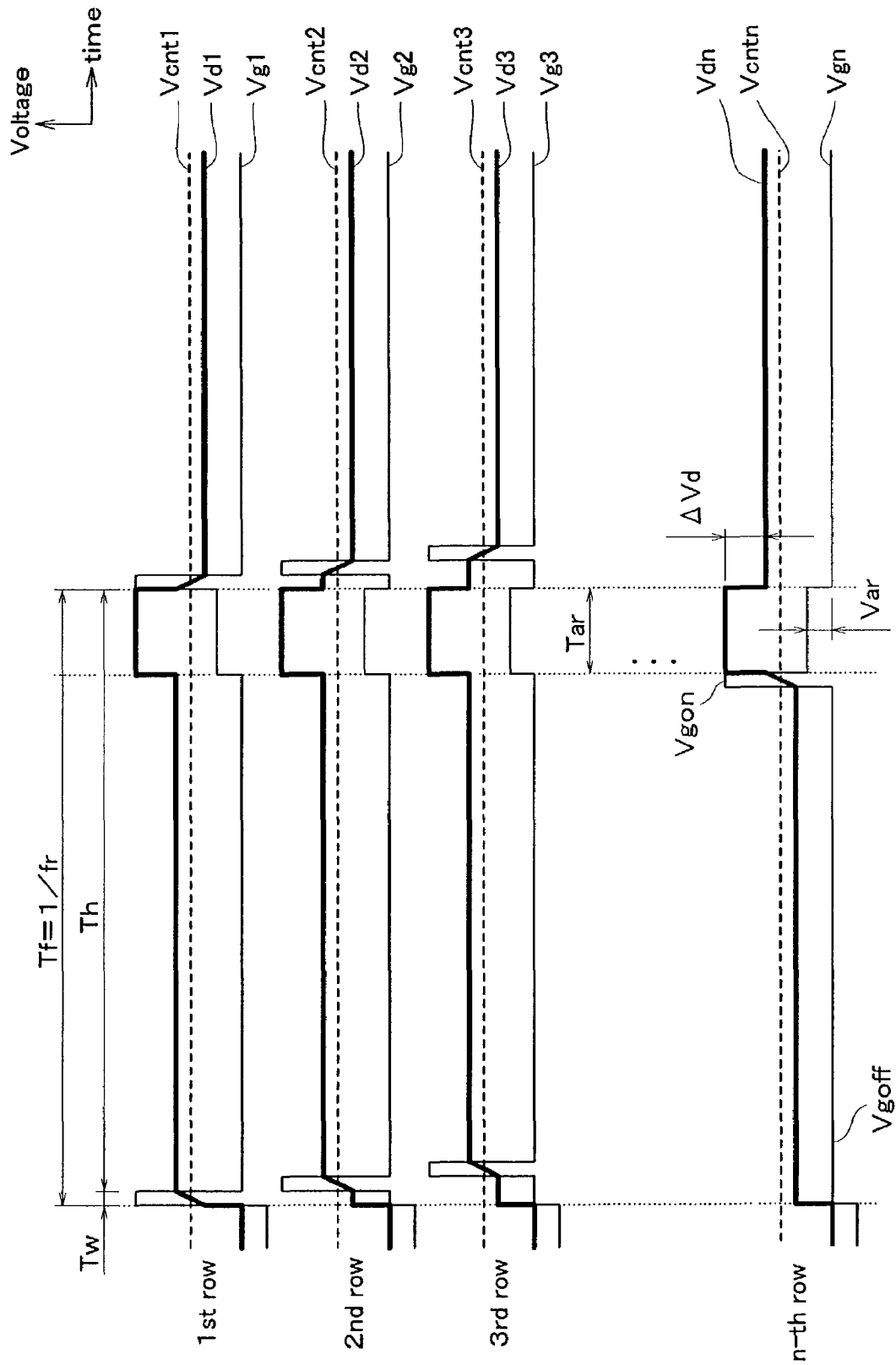
FIG. 7 is a waveform diagram showing change in gate signals, pixel voltages, and counter voltages in a liquid crystal display according to a second embodiment of the present invention.

FIG. 7 is a waveform diagram showing change in gate signals, pixel voltages, and counter voltages in a liquid crystal display according to a second embodiment of the present invention. In FIG. 7, the same reference numerals as those of FIG. 5 are used to indicate the same or corresponding parts.

As shown in FIG. 7, differently from the first embodiment, in this embodiment, the superposing period Tar during which the superposed voltage Var is superposed on the gate signals Vg1–Vgn are set at a fixed position on time axis in the frame period Tf. The other respects are similar to those of the first embodiment. Here, the superposing period Tar is set to be located at the rear of the frame period Tf. The write period Tw is set in such a manner that the period excepting the superposing period Tar in the frame period Tf is divided into equal parts as many as n rows. Under the setting, the superposed voltage Var is simultaneously superposed on all the gate signals G1–Gn. Therefore, as show in a modification described below, darkening the backlight according to the superposing of the superposed voltage Var, could lead to improved sharpness of images. In addition, the superposing period Tar is located at the rear of the frame period Tf, and hence, located in a blanking period of the video signal 110. Thus, the superposed voltage Var can be superposed without interference with image display.

Subsequently, a modification of this embodiment will be described. In this modification, as indicated by a dotted line shown in FIG. 1, a clock signal 121 of the drive control portion 101 is input to the backlight luminance control portion 104, which reduces the luminance of the backlight 105 or turns off the backlight 105 over the superposing period Tar in accordance with the clock signal 121. Thereby, contrast ratio between the image display period and the superposing period Tar is increased, thereby displaying an image with improved sharpness. Consequently, it is possible to reduce blurring in displaying the moving images on a television or the like, which is one of the problems associated with image display in the liquid crystal display.

Embodiment 3

Figure 8:
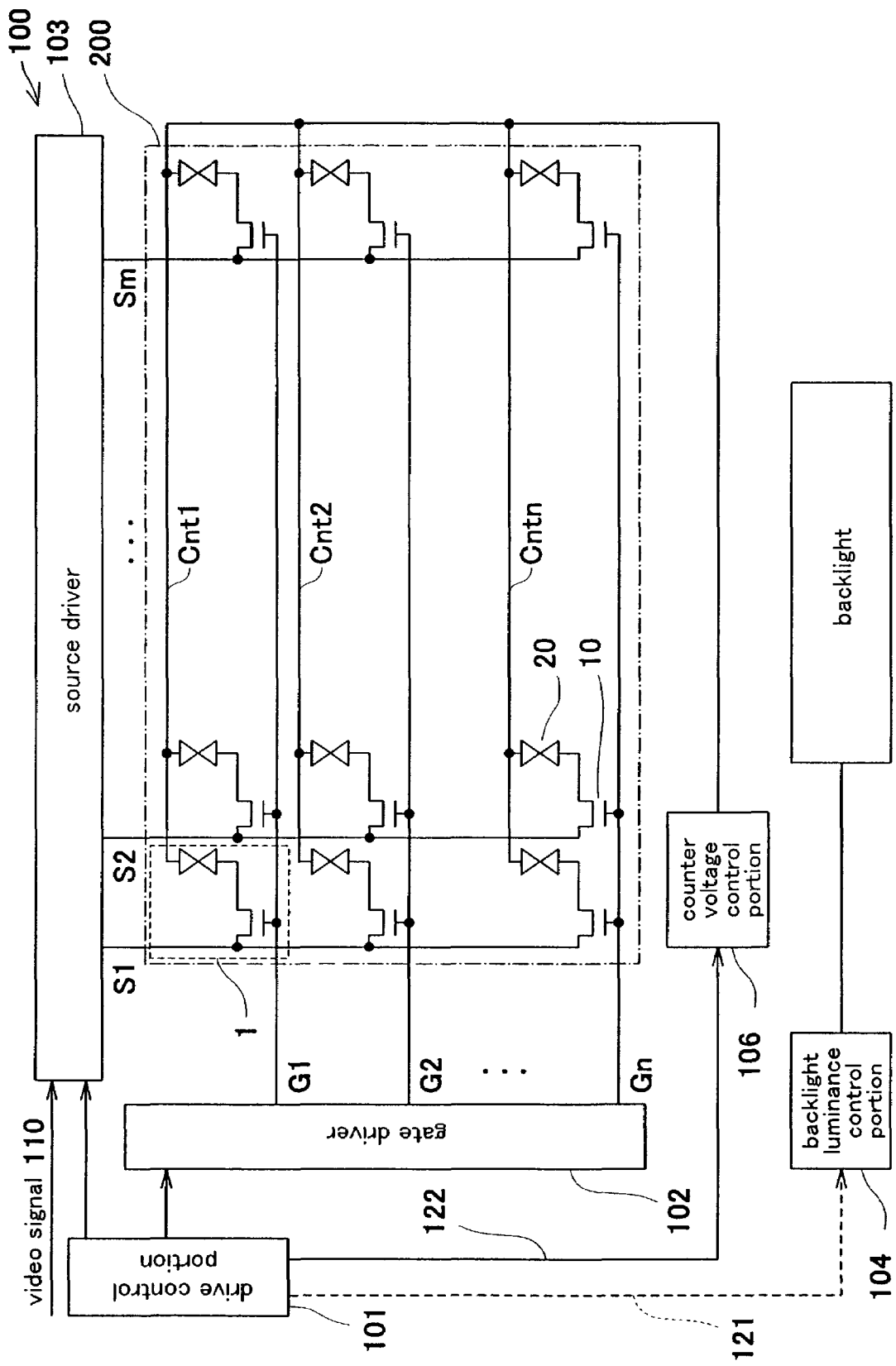
FIG. 8 is a functional block diagram showing a constitution of a liquid crystal display according to a third embodiment of the present invention.
Figure 9:
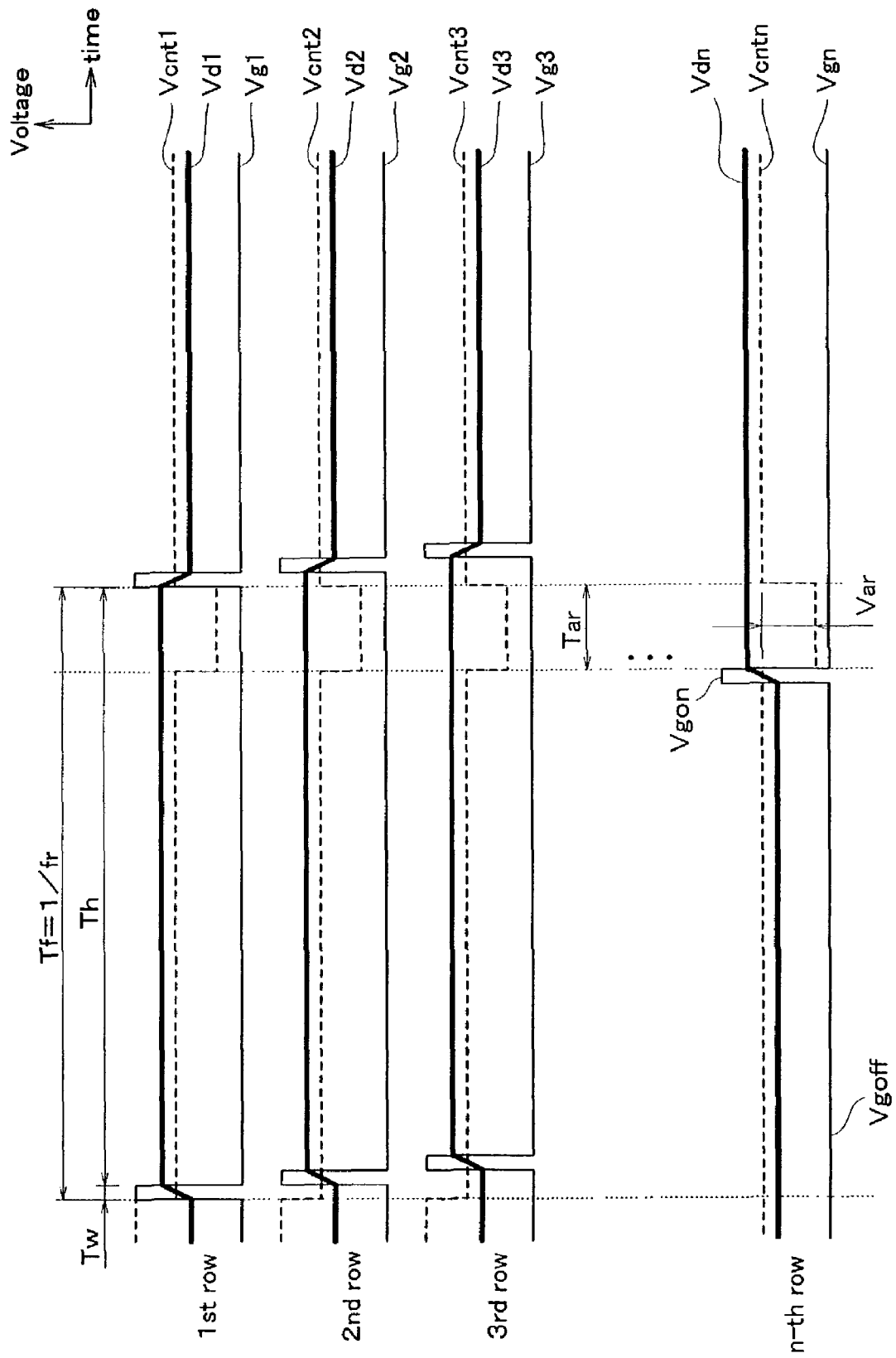
FIG. 9 is a waveform diagram showing change in gate signals, pixel voltages, and counter voltages in the liquid crystal display of FIG. 8.

FIG. 8 is a functional block diagram showing a constitution of a liquid crystal display according to a third embodiment of the present invention. FIG. 9 is a waveform diagram showing change in gate signals, pixel voltages, and counter voltages in the liquid crystal display of FIG. 8. In FIGS. 8, 9, the same reference numerals as those of FIGS. 1, 5 are used to indicate the same or corresponding parts.

As shown in FIG. 8, differently from the first embodiment, in this embodiment, a clock signal 122 from the control drive portion 101 is input to the counter voltage control portion 106. On the other hand, the storage capacitor is not formed between the pixel electrode and the gate line Gx, and therefore, the gate line G0 in first stage for the purpose of formation of only the storage capacitor of FIG. 1 is not provided. The other respects are similar to those of the first embodiment, either. The storage capacitor may be formed as necessary.

Subsequently, an operation (driving method) of the liquid crystal display 100 so constituted will be described.

As shown in FIGS. 8, 9, the counter voltage control portion 106 performs control so that the superposed voltage Var is superposed on the counter voltage Vcntx over the superposing period Tar in the hold period Th. Similarly to the second embodiment, the superposing period Tar is set to be located at a fixed position on time axis in the frame period Tf, and more specifically, at the rear of the frame period Tf. The superposed voltage Var has a polarity opposite to that of the source signal. That is, in a positive frame, the superposed voltage Var of negative polarity is superposed, while in a negative frame, the superposed voltage Var of positive polarity is superposed. As a result, the superposed voltage Var is superposed on the liquid crystal application voltage and functions as the pixel electrode superposed voltage ΔVd in the first embodiment. Therefore, by setting the superposed voltage (backward-transition-prevention voltage) Var in the same manner as the pixel electrode superposed voltage ΔVd in the first embodiment, the backward transition of the liquid crystal layer 210 can be prevented. In this embodiment, advantageously, the fluctuation of the potential of the pixel electrode is little before and after the superposing period Tar because there is no change in the potential of the pixel electrode.

As a modification of this embodiment, as indicated by a dotted line in FIG. 8, the clock signal 121 from the drive control portion 101 may be input to the backlight luminance control portion 104, which reduces the luminance of the backlight 105 or turns off the backlight 105 over the superposing period Tar in accordance with the clock signal 121. Thereby, contrast ratio between the image display period and the superposing period Tar is increased, thereby displaying an image with improved sharpness.

Figure 10:
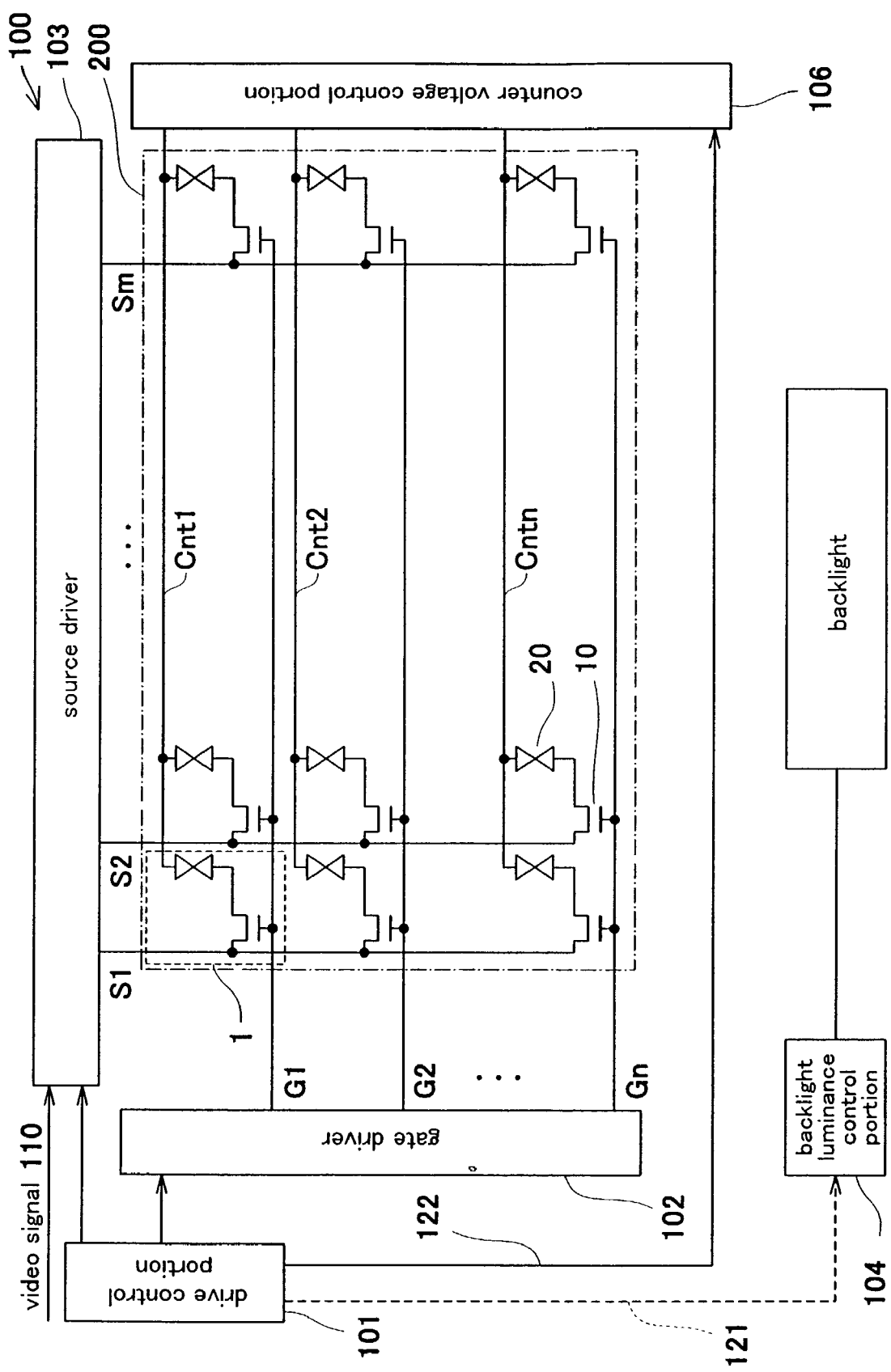
FIG. 10 is a functional block diagram showing a constitution of a liquid crystal display according to a modification of the third embodiment of the present invention.

Similarly to the first embodiment, the superposing period Tar may be set at the fixed position on time axis in the hold period Tg. In this case, n counter electrodes Cnt1–Cntn may be formed like band as corresponding to the rows of the pixel electrodes 2 in matrix of the TFT substrate, and as shown in FIG. 10, the counter electrodes Cnt1–Cntn may be connected in parallel to the counter electrode control portion 106, which individually controls the counter voltages Vcnt1–Vcntn of the respective counter electrodes Cnt1–Cntn.

Embodiment 4

Figure 11:
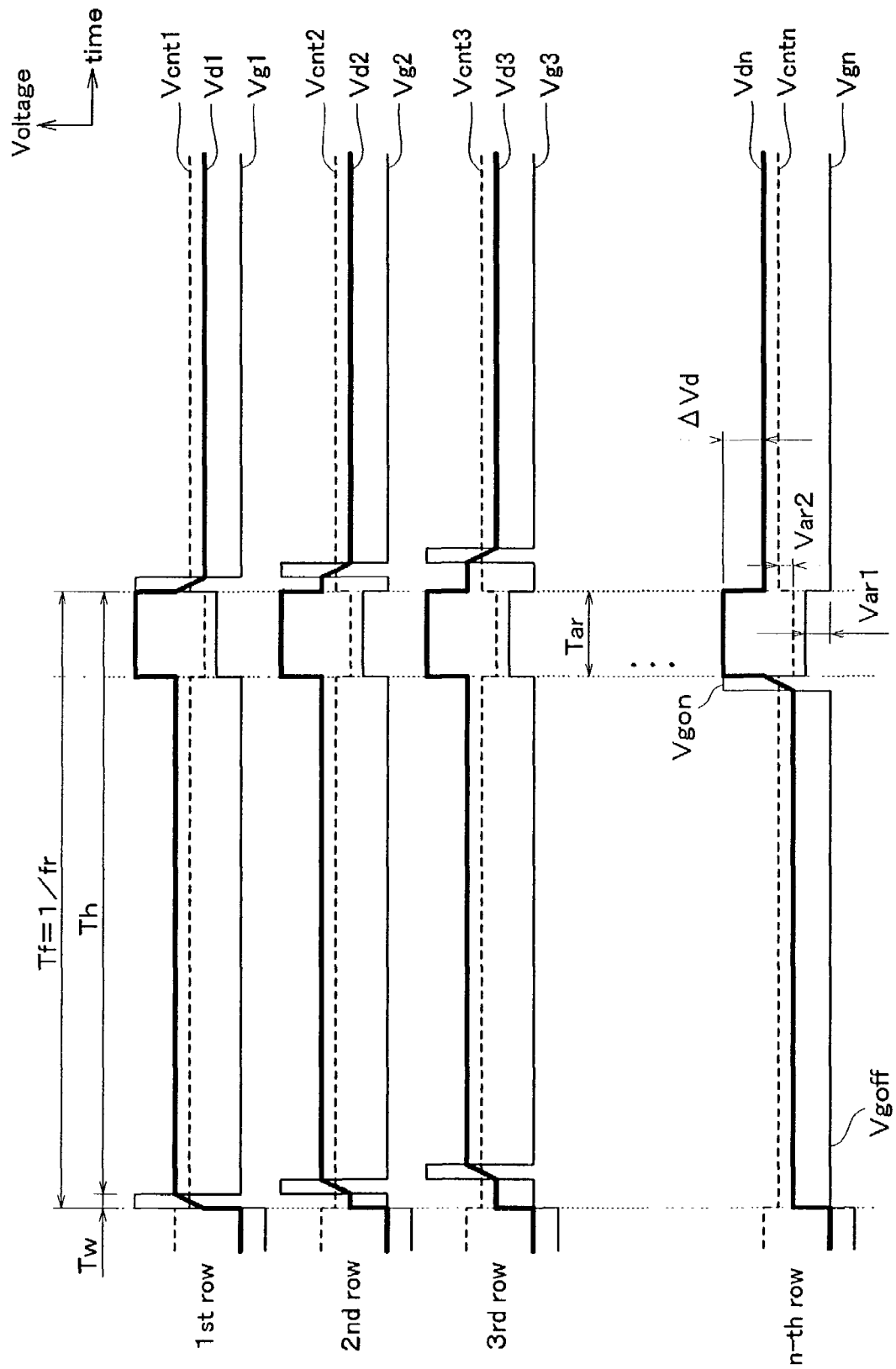
FIG. 11 is a waveform diagram showing change in gate signals, pixel voltages, and counter voltages in a liquid crystal display according to a fourth embodiment of the present invention.

FIG. 11 is a waveform diagram showing change in gate signals, pixel voltages, and counter voltages in a liquid crystal display according to a fourth embodiment of the present invention. In FIG. 11, the same reference numerals as those in FIGS. 7, 9 are used to indicate the same or corresponding parts.

This embodiment is a combination of the second embodiment and the third embodiment, and the liquid crystal display has the gate line G0 for formation of the storage capacitor 30 between the gate line G0 and the pixel electrode of the pixel on first row, which is shown in FIG. 1, in addition to the constitution of FIG. 8.

In the liquid crystal display 100 so constituted, as shown in FIGS. 1, 8, 11, the gate driver 102 superposes a first superposed voltage Var1 on the gate signals Vg1–Vgn over the superposing period Tar set at the rear of the frame period Tf, while the counter voltage control portion 106 superposes a second superposed voltage Var2 on the counter voltages Vcnt1–Vcntn over the superposing period Tar. This results in the liquid crystal application voltage superposed by the pixel electrode superposed voltage ΔVd due to the first superposed voltage Var1 and the second superposed voltage Var2. Therefore, by setting the voltage which is equal to the sum of the pixel electrode superposed voltage ΔVd and the second superposed voltage Var2 higher than |Vt–Vw| of FIG. 6(c),6(d), the backward transition of the liquid crystal layer 210 can be prevented. In this embodiment, since the pixel electrode superposed voltage Δvd and the second superposed voltage Var2 can be used as the backward-transition-prevention voltage, the backward-transition-prevention voltage can be set higher than those of the first and second embodiments, thereby reducing the superposing period Tar.

Similarly to the third embodiment, the backlight luminance control portion 104 may be adapted to turn off the backlight 105 during the superposing period Tar in accordance with the clock signal 121 from the drive control portion 101, thereby obtaining a display image with improved sharpness.

Also, similarly to the first embodiment, the superposing period Tar may be set at the fixed position on time axis in the hold period Th.

Embodiment 5

The first, second and fourth embodiments illustrates that the present invention is applied to the liquid crystal display in which the storage capacitor is formed on the gate line (hereinafter referred to as on-gate type), while a fifth embodiment illustrate that the present invention is applied to a liquid crystal display in which the storage capacitor is formed on a common line (hereinafter referred to as a common-line type).

Figure 12:
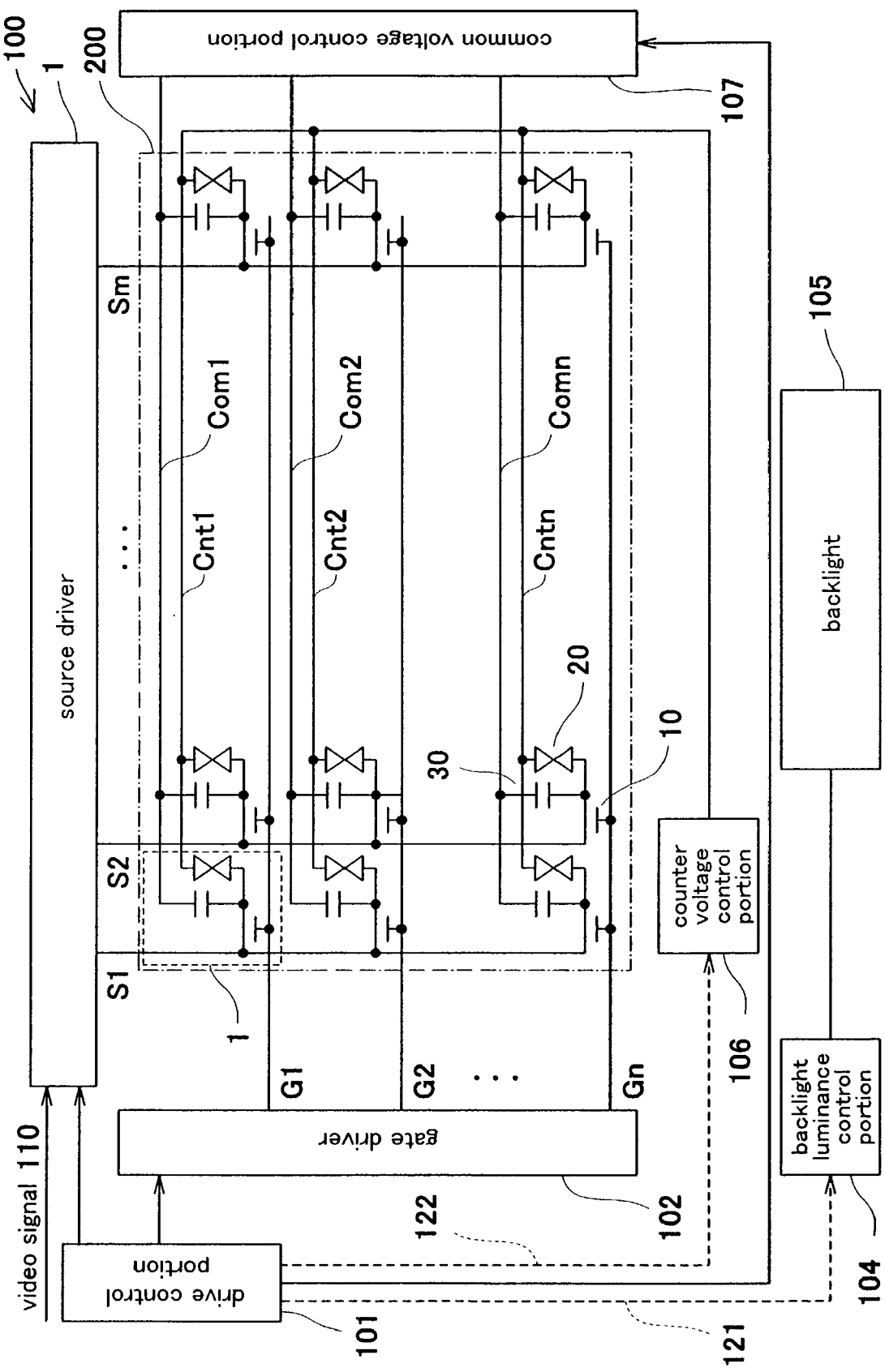
FIG. 12 is a functional block diagram showing a constitution of a liquid crystal display according to a fifth embodiment of the present invention.
Figure 13:
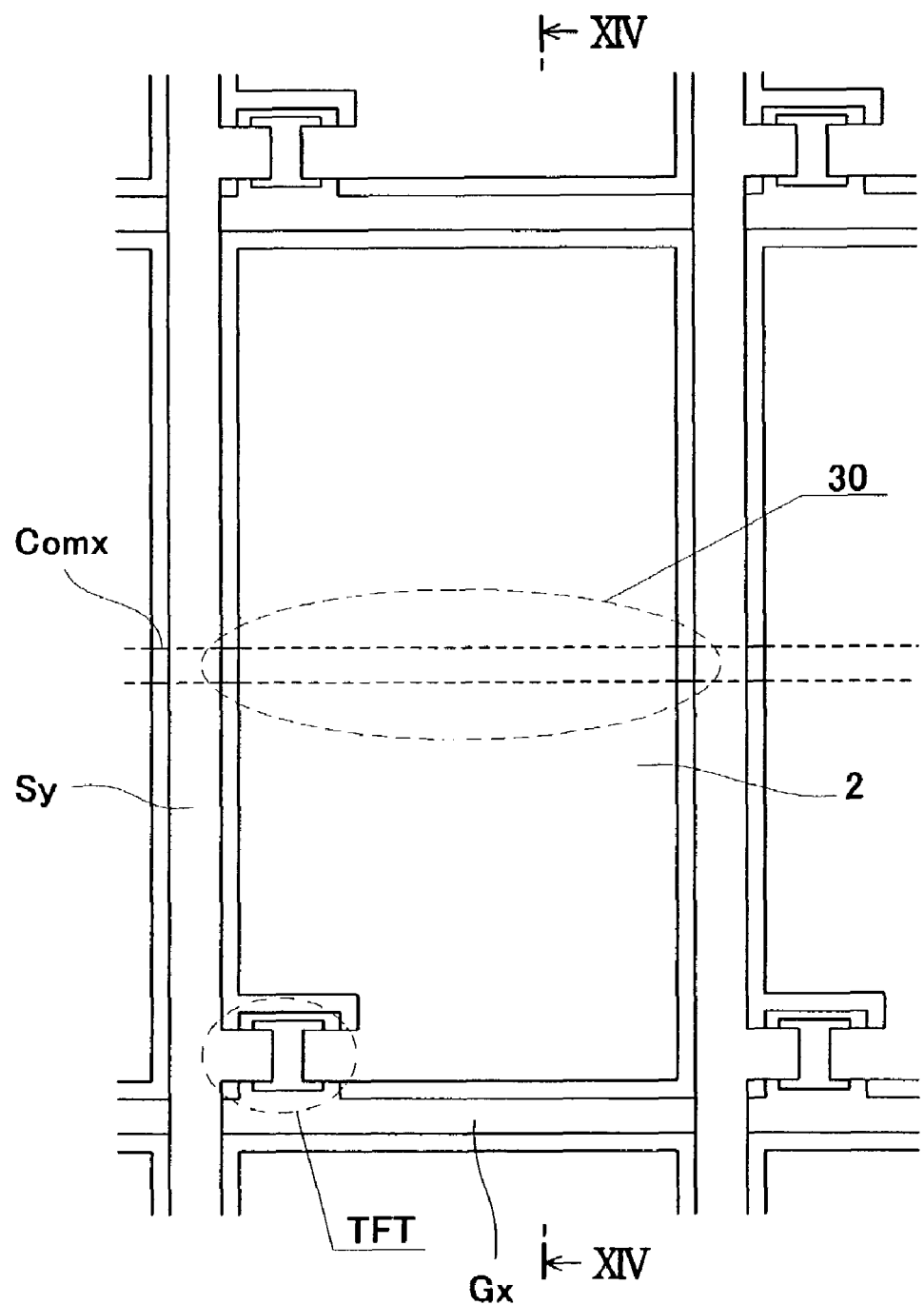
FIG. 13 is a plan view showing a constitution of a liquid crystal panel of the liquid crystal display of FIG. 12.
Figure 14:
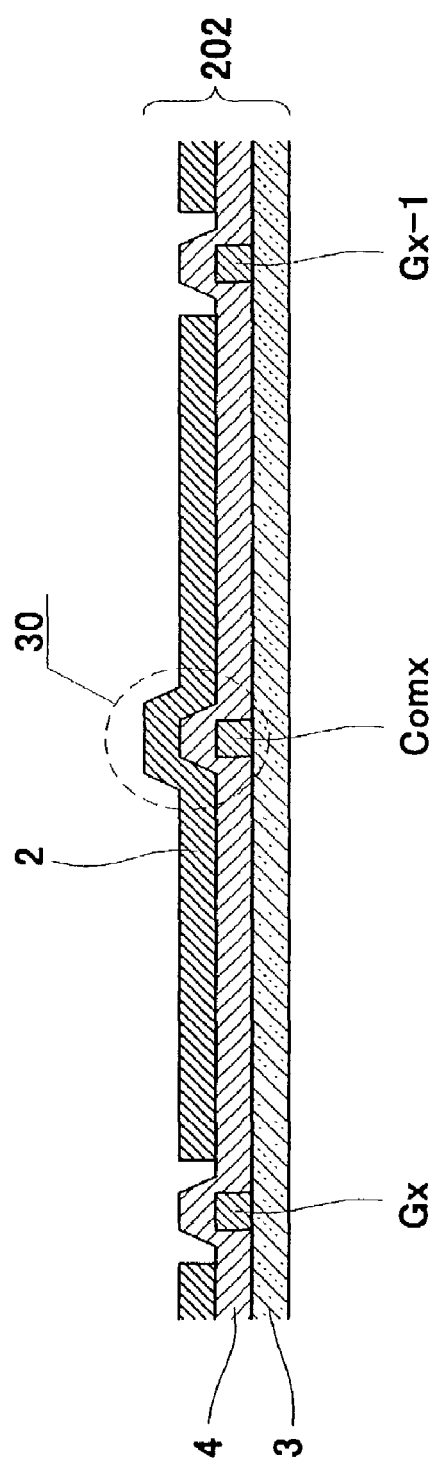
FIG. 14 is a cross-sectional view along line XIV—XIV of FIG. 13.

FIG. 12 is a functional block diagram showing a constitution of a liquid crystal display according to the fifth embodiment of the present invention. FIG. 13 is a plan view showing a constitution of a liquid crystal panel of the liquid crystal display of FIG. 12. FIG. 14 is a cross-sectional view along line XIV—XIV of FIG. 13. In FIGS. 12, 13, 14, the same reference numerals as those in FIGS. 1, 3, 4 are used to indicate the same or corresponding parts.

Differently from the first embodiment, in this embodiment, as shown in FIGS. 12–14, a common line Comx is formed in parallel with the gate line Gx for each row of the pixels 1. The common line Comx is located under the pixel electrode 2 with an insulating layer 4 interposed between them. Storage capacitor (control capacitor) 30 is formed between the common line Comx and the pixel electrode 2 on the corresponding row. Therefore, the gate line G0 for the purpose of formation of only the storage capacitor which is shown in FIG. 1 is not provided. Potentials Vom1–Vcomn of common lines Com1–Comn (hereinafter referred to as common voltage) are controlled by the common voltage control portion 101 in accordance with a clock signal from the control drive portion 101. The other respects are identical to those of the first embodiment.

Figure 15:
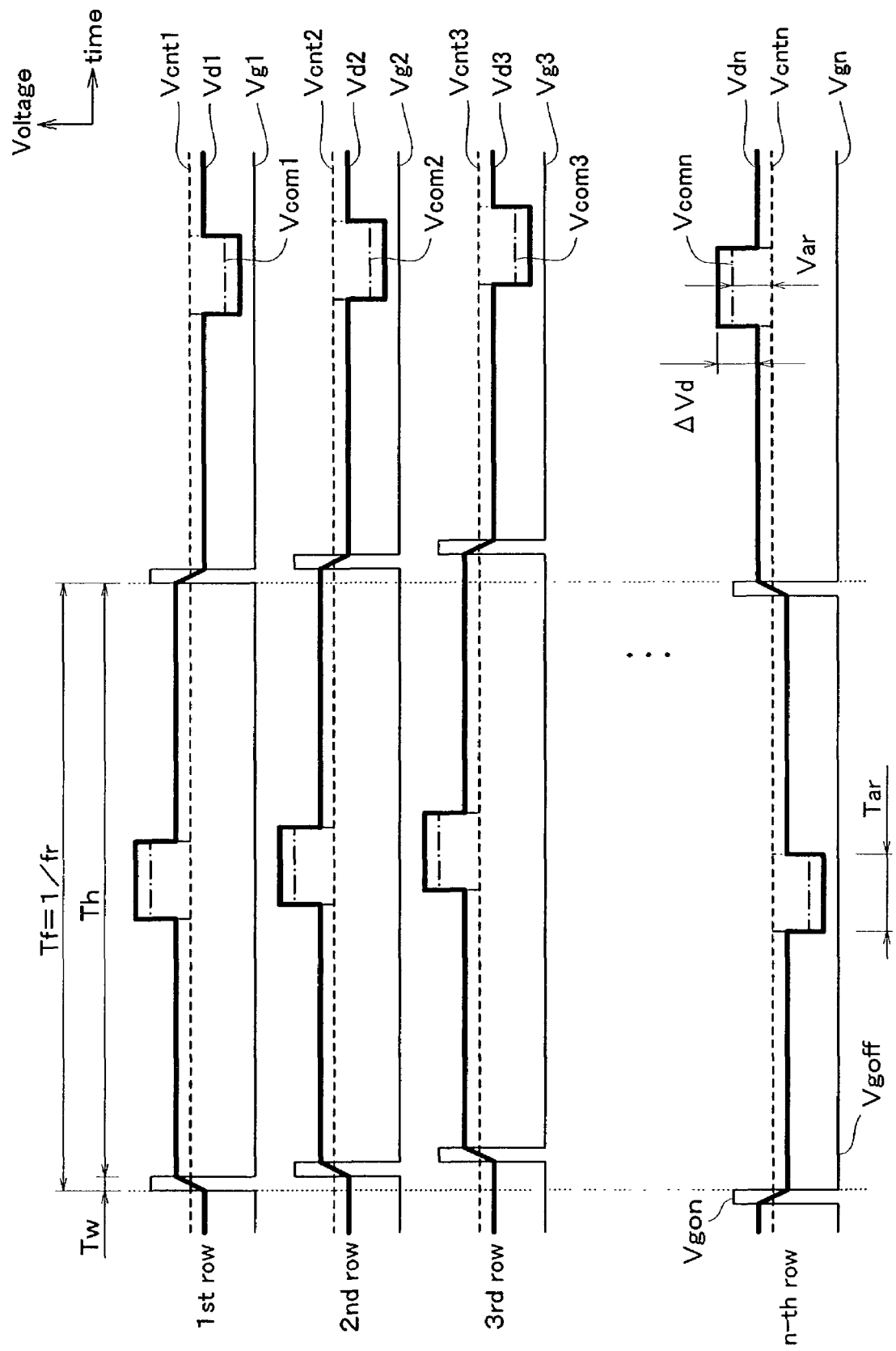
FIG. 15 is a waveform diagram showing change in gate signals, pixel voltages, counter voltages, and common voltages in the liquid crystal display of FIG. 12.

Subsequently, an operation (driving method) of the liquid crystal display so constituted will be described with reference to FIGS. 12–15. FIG. 15 is a waveform diagram showing change in gate signals, pixel voltages, counter voltages, and common voltages in the liquid crystal display of FIG. 12. In FIG. 15, the same reference numerals as those of FIG. 5 denote the same or corresponding parts. In FIG. 15, the common voltage Vcomx is set to a constant voltage equal to the counter voltage Vcntx excepting the superposing period Tar and indicated by a dashed line only in the superposing period Tar. As a matter of course, the common voltage Vcomx in the period other than the superposing period Tar, may be set to a constant voltage different from the counter voltage Vcnx.

With reference to FIGS. 12–15, the common voltage control portion 107 performs control so that the superposed voltage Var is superposed on the common voltage Vcomx over the superposing period Tar in the hold period Th. The superposing period Tar is, similarly to the first embodiment, set to be located at substantially the center on time axis in the hold period Th. The superposed voltage Var is equal in polarity to the pixel voltage Vdx written from the source signal onto the pixel electrode. Under the setting, when the superposing period Tf comes, the common voltage Vcomx changes by the superposed voltage Var and the pixel voltage Vdx is affected by the change due to the superposed voltage Var through the storage capacitor 30 and changes. The change in the pixel electrode Vdx, i.e., the pixel electrode superposed voltage ΔVd is given by the formula (1) described in the first embodiment.

Therefore, by setting the pixel electrode superposed voltage ΔVd higher than |Vt−Vw| of FIGS. 6(b), 6(d), the backward transition of the liquid crystal layer 210 can be prevented.

While in this embodiment, the superposed voltage Var is applied for each common line, this may be superposed for each set of plural adjacent or apart common lines.

Embodiment 6

Figure 16:
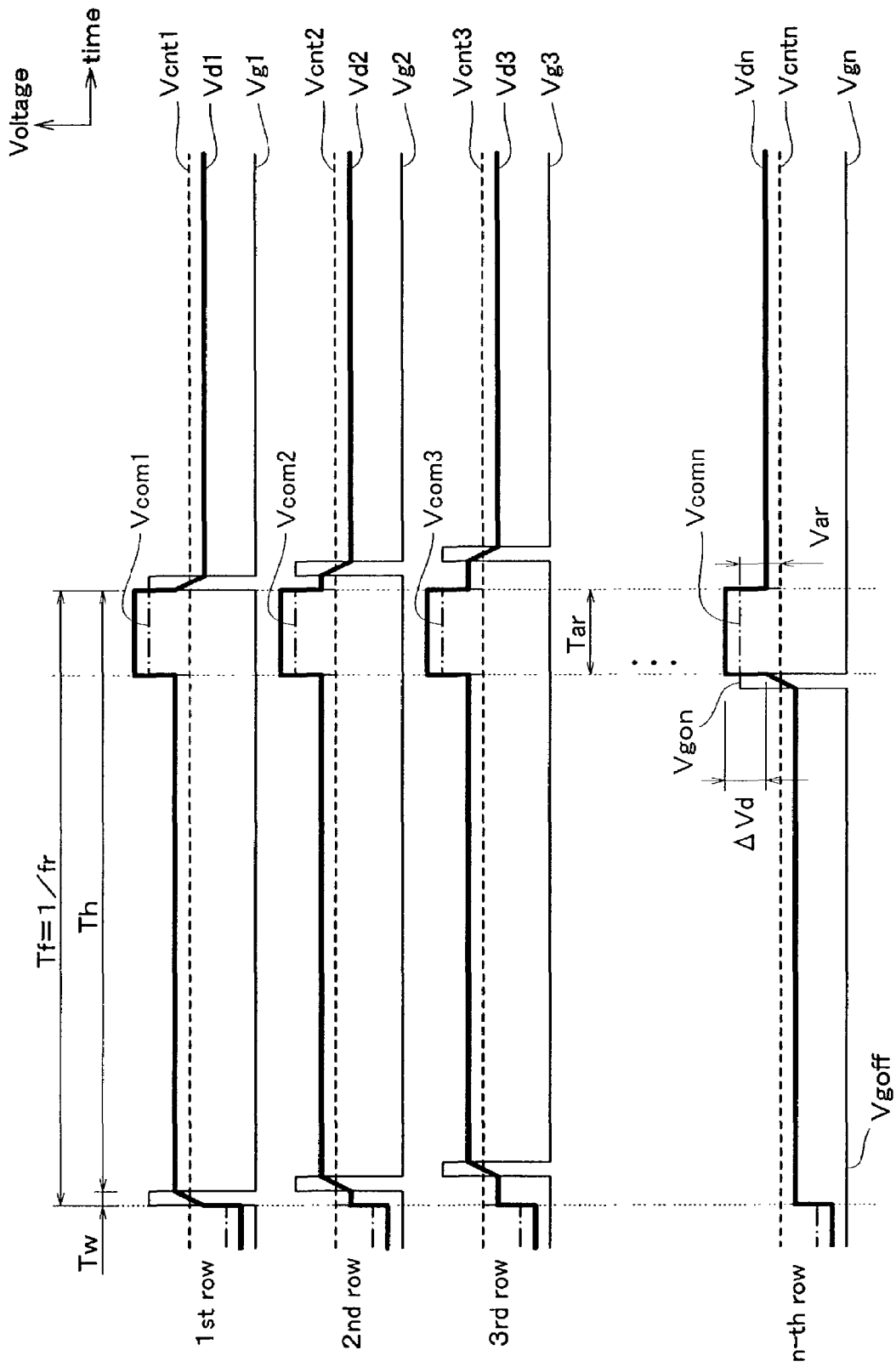
FIG. 16 is a waveform diagram showing change in gate signals, pixel voltages, counter voltages and common voltages in a liquid crystal display according to a sixth embodiment of the present invention.

FIG. 16 is a waveform diagram showing change in gate signals, pixel voltages, counter voltages and common voltages in a liquid crystal display according to a sixth embodiment of the present invention. In FIG. 16, the same reference numerals as those of FIG. 15 are used to indicate the same or corresponding parts. In FIG. 16, the common voltage Vcomx is set to a constant voltage equal to the counter voltage Vcntx except for the superposing period Tar and indicated by a dashed line only in the superposing period Tar.

As shown in FIG. 16, differently from the fifth embodiment, in this embodiment, the superposing period Tar during which the superposed voltage Var is superposed on the common voltages Vcom1–Vcomn are set at a fixed position on time axis in the frame period Tf. The other respects are similar to those of the fifth embodiment. Here, the superposing period Tar is set to be located at the rear of the frame period Tf. Also, the write period Tw is set to have a length obtained by dividing the period excepting the superposing period Tar in the frame period Tf into equal parts as many as n rows. Under the setting, the superposed voltage Var is simultaneously superposed on all the common voltages Vcom1–Vcomn. Therefore, as shown in the modification below, darkening the backlight according to the superposing of the superposed voltage Var, leads to improved sharpness of images. In addition, the superposing period Tar is located at the rear of the frame period Tf, and hence, located in a blanking period of the video signal 110. As a result, the superposed voltage Var can be superposed without interference with image display.

Subsequently, a modification of this embodiment will be described. In this modification, as indicated by a dotted line shown in FIG. 12, the clock signal 121 from the drive control portion 101 is input to the backlight luminance control portion 104, which reduces the luminance of the backlight 105 or turns off the backlight 105 over the superposing period Tar in accordance with the clock signal 121. Thereby, contrast ratio between the image display period and the superposing period Tar is increased, thereby displaying an image with improved sharpness.

Embodiment 7

Figure 17:
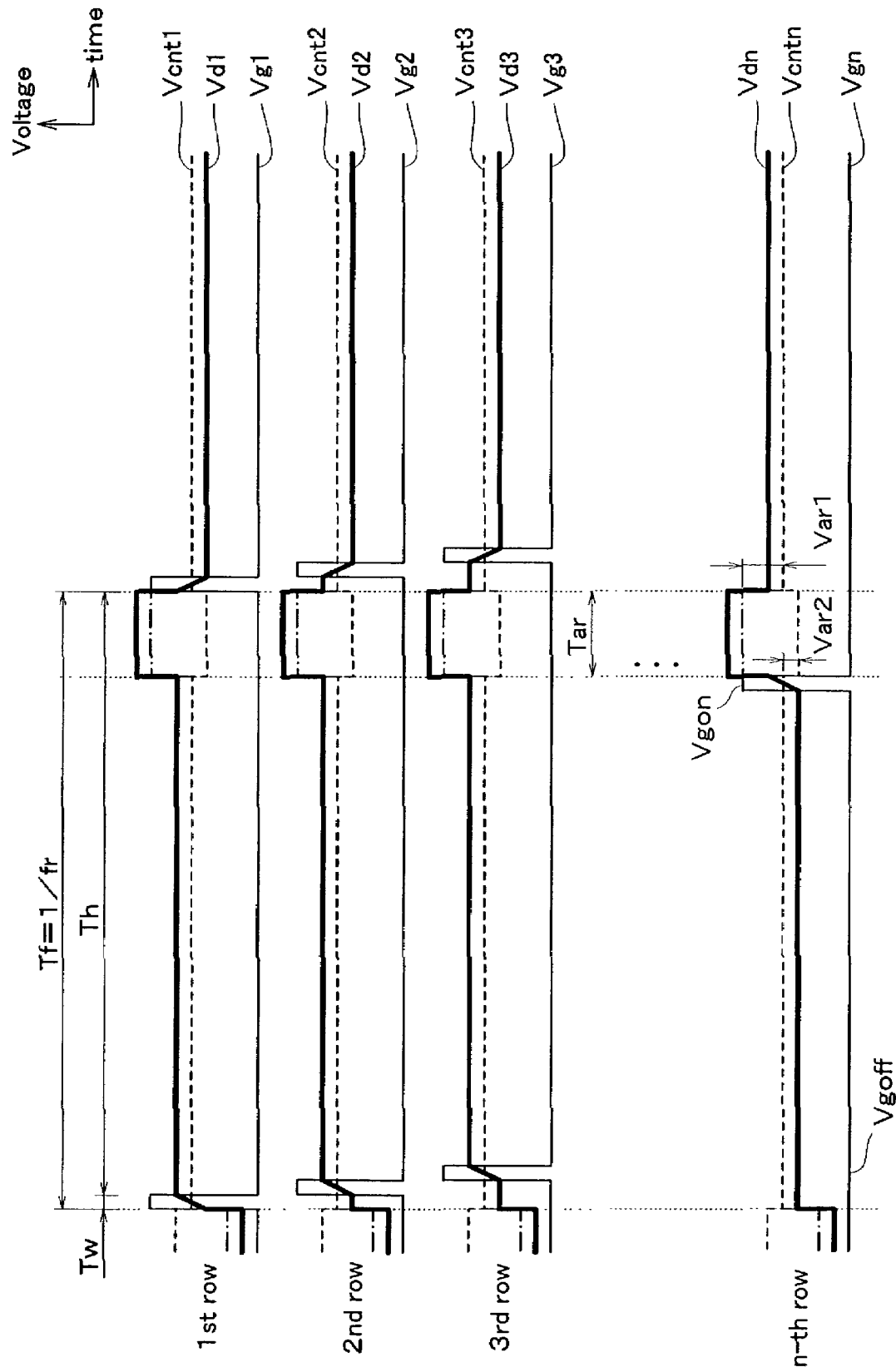
FIG. 17 is a waveform diagram showing change in gate signals, pixel voltages, counter voltages and common voltages in a liquid crystal display according to a seventh embodiment of the present invention.

FIG. 17 is a waveform diagram showing change in gate signals, pixel voltages, counter voltages and common voltages in a liquid crystal display according to a seventh embodiment of the present invention. In FIG. 17, the same reference numerals as those of FIGS. 9, 16 are used to indicate the same or corresponding parts. In FIG. 17, the common voltage Vcomx is set to a constant voltage equal to the counter voltage Vcntx except for the superposing period Tar and indicated by a dashed line only in the superposing period Tar.

This embodiment is a combination of the third embodiment and the sixth embodiment. As shown by a dotted line in FIG. 12, the clock signal 122 from the drive control 101 is input to the counter voltage control portion 106.

In the liquid crystal display 100 so constituted, as shown in FIGS. 12, 17, the common voltage control portion 107 superposes the first superposed voltage Var1 on the common voltages Vcom1–Vcomn over the superposing period Tar set at the rear of the frame period Tf and the counter voltage control portion 106 superposes the second superposed voltage Var2 on the counter voltages Vcnt1–Vcntn over the superposing period Tar. This results in a liquid crystal application voltage superposed by the pixel electrode superposed voltage ΔVd due to the first superposed voltage Var1 and the second superposed voltage Var2. By setting the voltage which is equal to the sum of the pixel electrode superposed voltage ΔVd and the second superposed voltage Var2 higher than |Vt−Vw| of FIG. 6(C), 6(d), the backward transition of the liquid crystal layer 210 can be prevented. In this embodiment, further, since the pixel electrode superposed voltage ΔVd and the second superposed voltage Var2 can be used as the backward-transition-prevention voltage, which can be therefore set higher than those of the third and sixth embodiments, the superposing period Tar can be reduced.

Still further, similarly to the third embodiment, the backlight luminance control portion 104 may be adapted to darken the backlight 105 during the superposing period Tar in accordance with the clock signal 121 from the drive control portion 101, thereby obtaining an image with improved sharpness.

Moreover, the superposing period Tar may be set to be located at the fixed position on time axis in the hold period Th.

Embodiment 8

Figure 18:
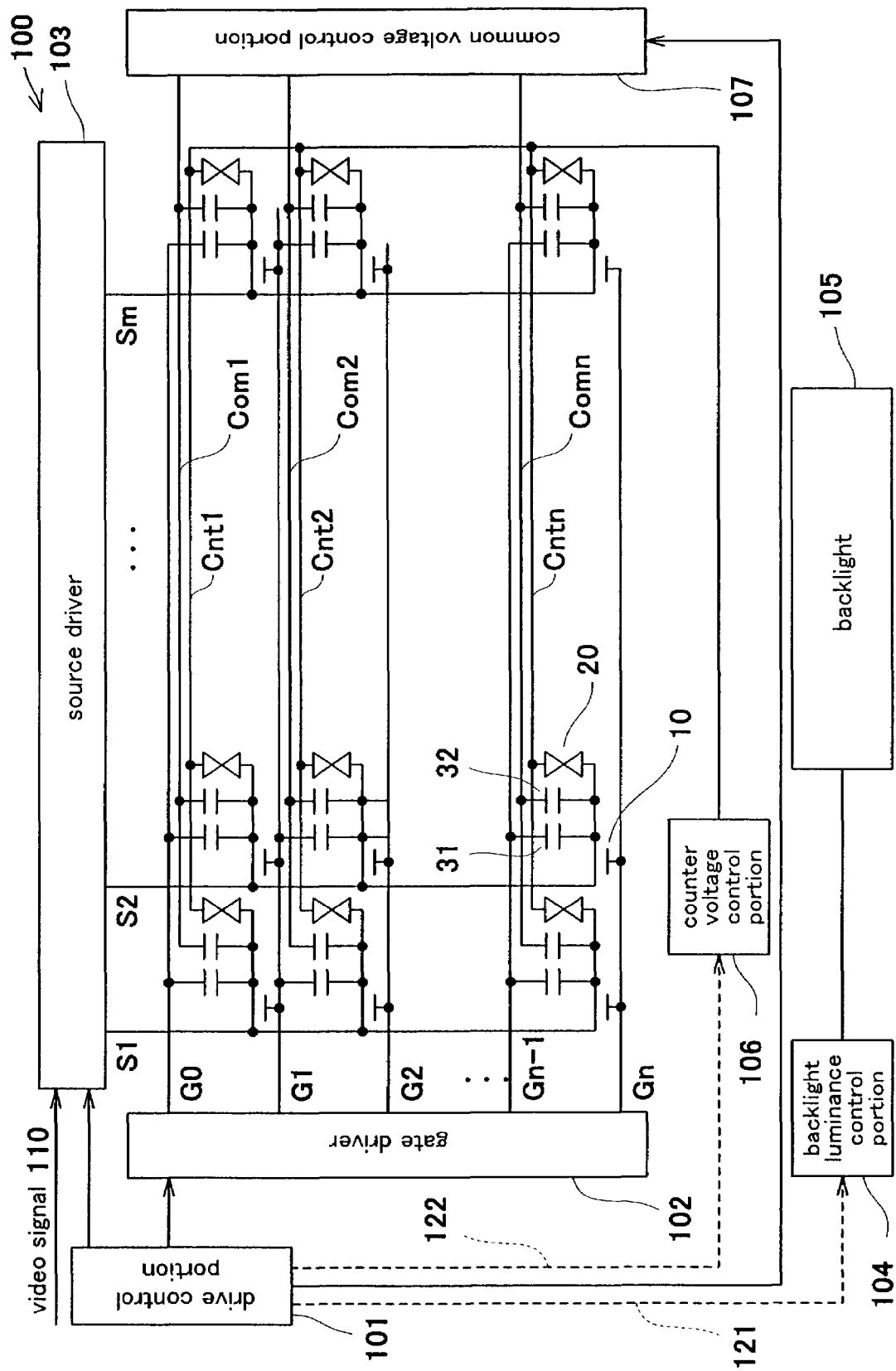
FIG. 18 is a functional block diagram showing a constitution of a liquid crystal display according to an eighth embodiment of the present invention.
Figure 19:
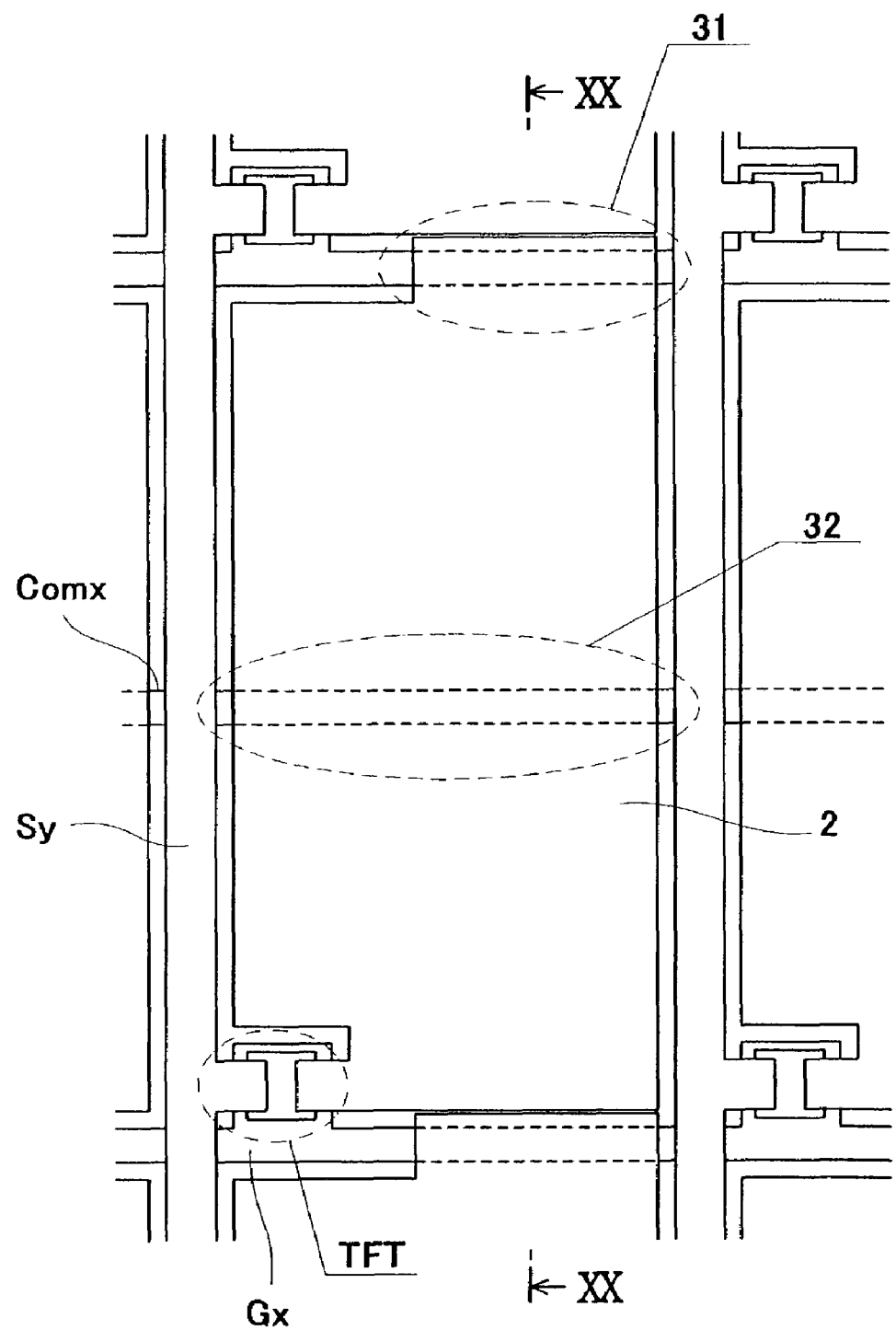
FIG. 19 is a plan view showing a constitution of a liquid crystal panel of the liquid crystal display of FIG. 18.
Figure 20:
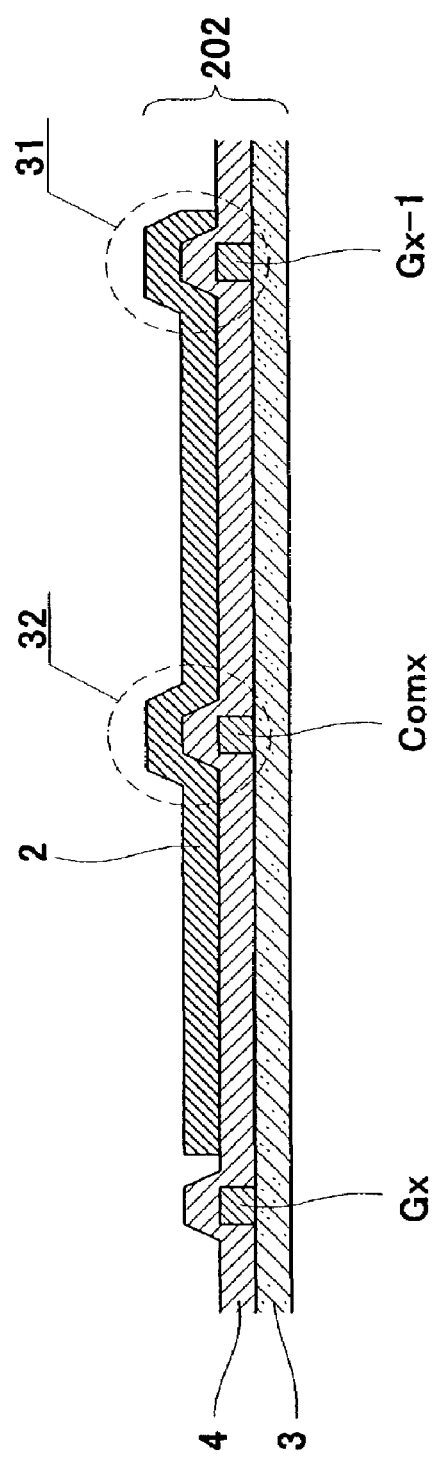
FIG. 20 is a cross-sectional view along line XX—XX of FIG. 19.

FIG. 18 is a functional block diagram showing a constitution of a liquid crystal display according to an eighth embodiment of the present invention. FIG. 19 is a plan view showing a constitution of a liquid crystal panel of the liquid crystal display of FIG. 18. FIG. 20 is a cross-sectional view along line XX—XX of FIG. 19. In FIGS. 18–20, the same reference numerals as those in FIGS. 1–4, and 12–14 are used to indicate the same or corresponding parts.

This embodiment is a combination of the first embodiment and the fifth embodiment. Further, in the constitution of the first embodiment, as described in the fifth embodiment, the common line Comx is formed in parallel with the gate line Gx for each row of the pixel 1 and the storage capacitor is formed between the common line Comx and the pixel electrode 2 on the corresponding row. In this embodiment, the storage capacitor formed between the pixel electrode 2 and the gate line Gx is called first storage capacitor 31 and the storage capacitor formed between the pixel electrode 2 and the common line Comx is called second storage capacitor 32.

Figure 21:
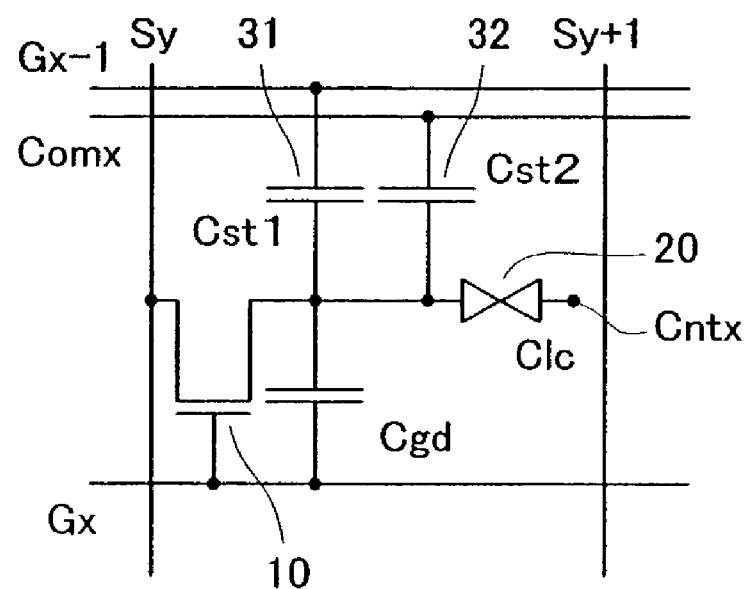
FIG. 21 is a circuit diagram showing an equivalent circuit in a signal system in a pixel of the liquid crystal display of FIG. 18.
Figure 22:
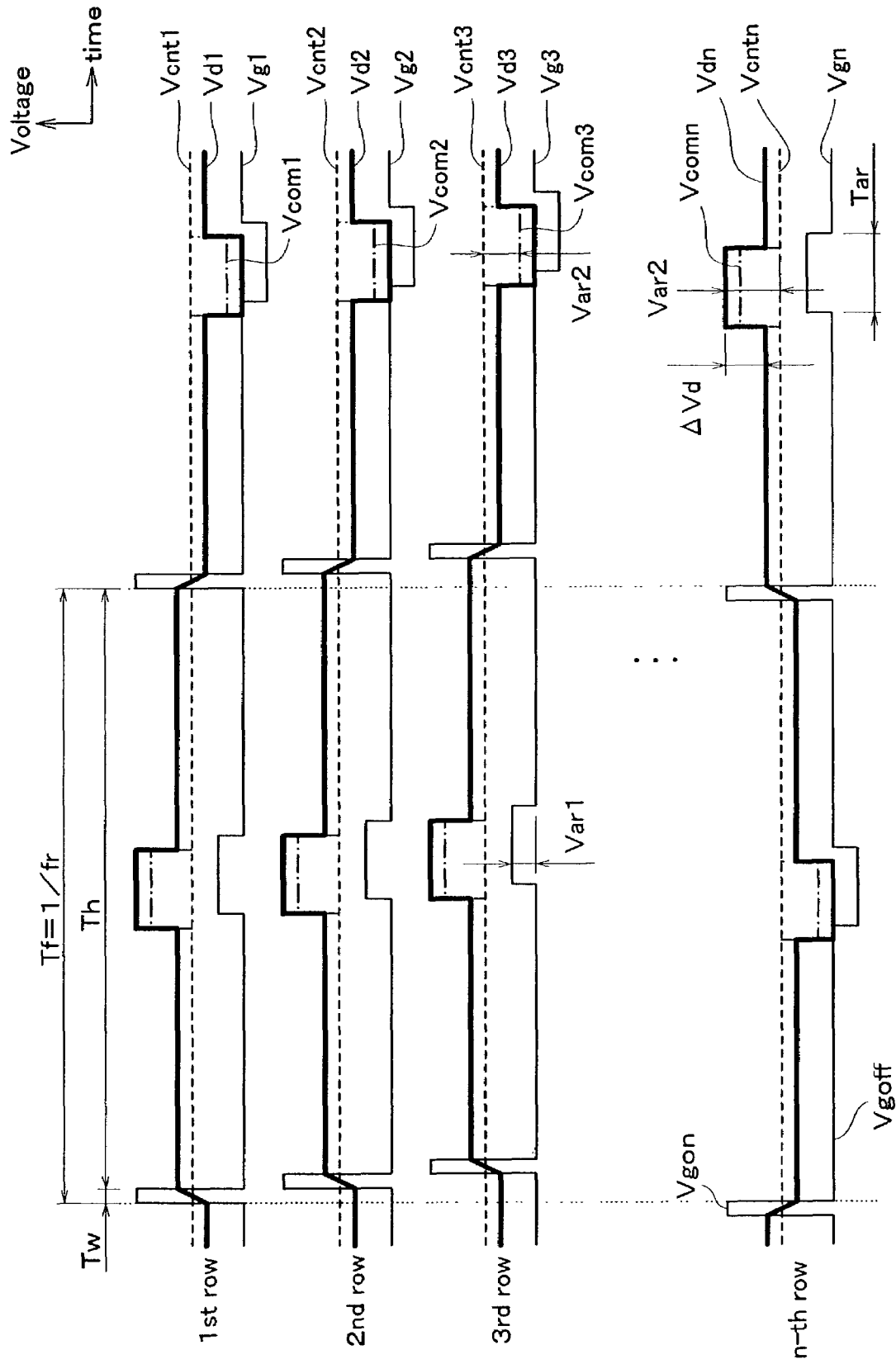
FIG. 22 is a waveform diagram showing change in gate signals, pixel voltages, counter voltages and common voltages in the liquid crystal display of FIG. 18.

Subsequently, an operation (driving method) of the liquid crystal display so constituted will be described with reference to FIGS. 18–22. FIG. 21 is a circuit diagram showing an equivalent circuit in a signal system in a pixel of the liquid crystal display of FIG. 18. FIG. 22 is a waveform diagram showing change in gate signals, pixel voltages, counter voltages and common voltages in the liquid crystal display of FIG. 18. In FIG. 21, the same reference numerals as those in FIG. 6(a) are used to indicate the same or corresponding parts. Also, in FIG. 22, the same reference numerals as those in FIGS. 5, 15 are used to indicate the same or corresponding parts. In FIG. 22, the common voltage Vcomx is set to a constant voltage equal to the counter voltage Vcntx except the superposing period Tar and indicated by a dashed line only during the superposing period Tar.

With reference to FIGS. 18–22, the gate driver 102 superposes the first superposed voltage Var1 on the gate signal Vgx-1 over the superposing period Tar in the hold period Th and the common voltage control portion 107 superposes the second superposed voltage Var2 on the common voltage Vcomx over the superposing period Tar. The superposing period Tar is, similarly to the first embodiment, set to be located at substantially the center on time axis in the hold period Th. The first and second superposed voltages Var1, Var2 are equal in polarity to the pixel voltage Vdx written from the source signal onto the pixel electrode. Under the setting, when the superposing period Tf comes, the gate signal Vgx-1 and the common voltage Vcomx changes by the first superposed voltage Var1 and the second superposed voltage Var2, respectively, and the pixel voltage Vdx is affected by the change due to the first superposed voltage Var1 and the second superposed voltage Var2 through the first storage capacitor 31 and the second storage capacitor 32, respectively, and changes. The pixel electrode superposed voltage (backward-transition-prevention voltage) ΔVd as the change in the pixel voltage Vdx is given as follows.

As shown in FIG. 21, in an equivalent circuit in a signal system of the pixel 1, the first storage capacitor 31 and the second storage capacitor 32 are connected in parallel with each other. When capacitance of the first storage capacitor 31 and capacitance of the second storage capacitor 32 are represented by Cst1 and Cst2, respectively, the pixel electrode superposed voltage ΔVd is given by:

$$\Delta Vd = (Cst1/Ct)Var1 + (Cst2/Ct)var2 \quad \text{formula (2)}$$

where Ct=Cgd+Clc+Cst1+Cst2, and Cgd and Clc are the parasitic capacitance in the gate to drain of the TFT 10 and the capacitance of the liquid crystal capacitor 20, respectively.

By setting the pixel electrode superposed voltage ΔVd higher than |Vt–Vw| of FIGS. 6(c), 6(d), the backward transition of the liquid crystal layer 210 can be prevented.

In this embodiment, the case where the superposed voltage is superposed only on the gate line Gx corresponds to the first embodiment and the case where the superposed voltage is superposed only on the common voltage corresponds to the fifth embodiment. In this embodiment, the first superposed voltage Var1 and the second superposed voltage Var2 are superposed at the same timing and for the same period. When the first superposed voltage Var1 and the second superposed voltage Var2 thus at least partially overlap with each other, higher voltage can be superposed on the pixel voltage. Therefore, this is helpful in preventing backward transition when the voltage endurance of the gate driver 102 or the common voltage control portion 107 is low. Conversely, when the voltage endurance is sufficiently high, the first superposed voltage Var1 and the second superposed voltage Var2 are respectively applied during apart periods and the superposed voltage is superposed twice in one frame period Tf, thereby reducing loads on the gate driver 102 and the common voltage control portion 107.

While in this embodiment, the first and second superposed voltages Var1, Var2 are applied for every gate line and for every common line, the first and second superposed voltages Var1, Var2 or the superposed voltage Var may be applied for each set of plural adjacent or apart gate lines or common lines.

Embodiment 9

Figure 23:
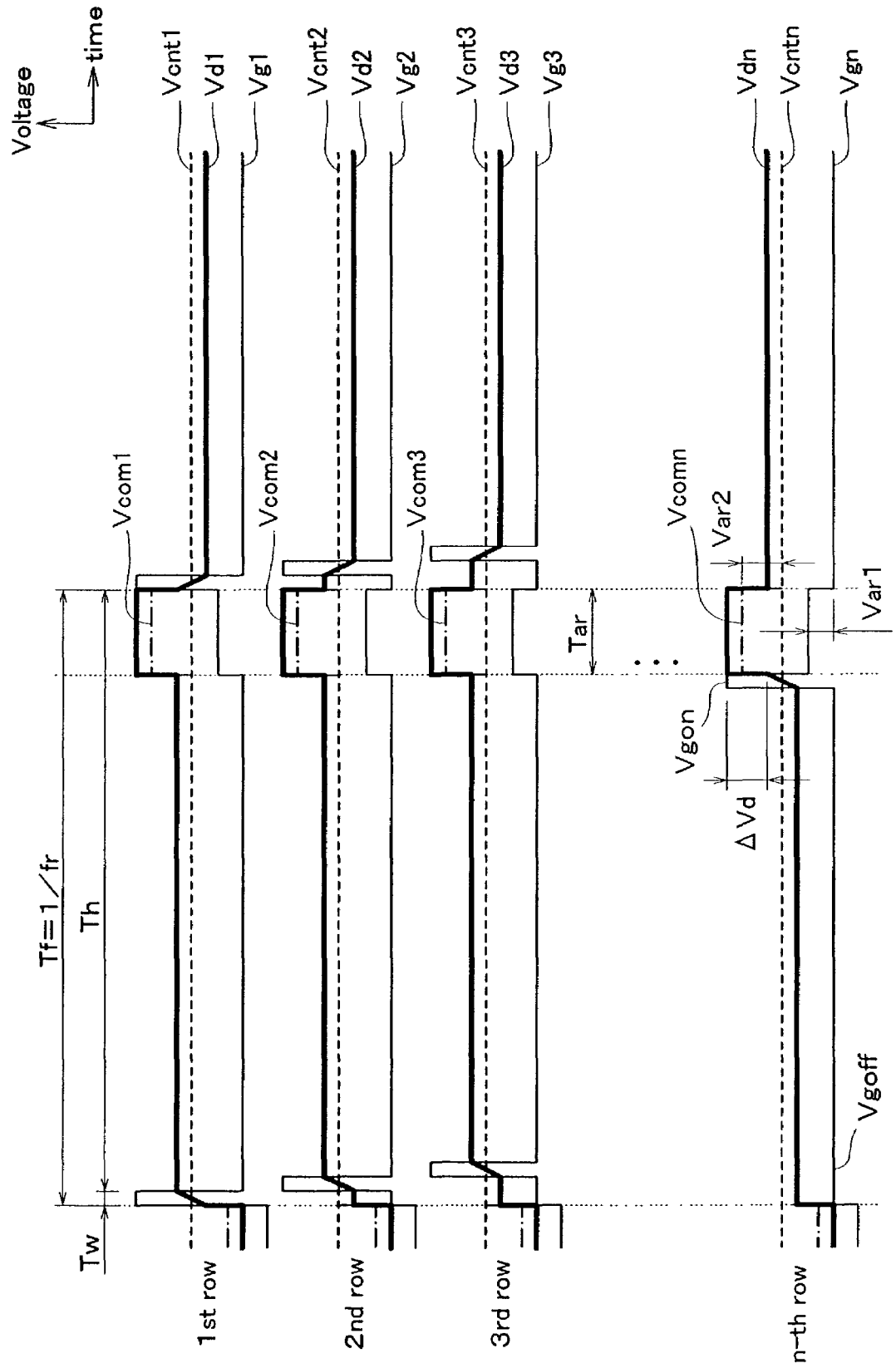
FIG. 23 is a waveform diagram showing change in gate signals, pixel voltages, counter voltages and common voltages in a liquid crystal display according to a ninth embodiment of the present invention.

FIG. 23 is a waveform diagram showing change in gate signals, pixel voltages, counter voltages, and common voltages in a liquid crystal display according to a ninth embodiment of the present invention. In FIG. 23, the same reference numerals as those of FIG. 22 are used to indicate the same or corresponding parts. In FIG. 23, the common voltage Vcomx is set to a constant voltage equal to the counter voltage Vcntx except for the superposing period Tar, and in FIG. 23, the common voltage Vcomx is indicated by a dashed line only during the superposing period Tar.

As shown in FIG. 23, in this embodiment, differently from the eighth embodiment, the superposing period Tar during which the first superposed voltage Var1 and the second superposed voltage Var2 are respectively superposed on the gate signals Vg1–Vgn and the common voltages Vcom1–Vcomn is set at the fixed position on time axis in the frame period Tf. The other respects are identical to those of the eighth embodiment. Here, the superposing period Tar is set to be located at the rear of the frame period Tf. The write period Tw is set to have a length obtained by dividing the period excepting the superposing period Tar in the frame period Tf into equal parts as many as n rows. Under the setting, since the superposed voltage Var is superposed on the common voltages Vcom1–Vcomn simultaneously, darkening the backlight 105 according to the superposing of the superposed voltage Var, leads to an image with improved sharpness, which will be described in a modification described below. In addition, the superposing period Tar is located at the rear of the frame period Tf, and hence, located in a blanking period of the video signal 110. Thereby, without interference with image display, the superposed voltage Var can be superposed.

Subsequently, the modification of this embodiment will be described. In this modification, as indicated by a dotted line shown in FIG. 18, the clock signal 121 from the drive control portion 101 is input to the backlight luminance control portion 104, which reduces the luminance of the backlight 105 or turns off the backlight 105 over the superposing period Tar in accordance with the clock signal 121 over the superposing period Tar. Thereby, contrast ratio between the image display period and the superposing period Tar is increased, thereby displaying an image with improved sharpness.

Embodiment 10

Figure 24:
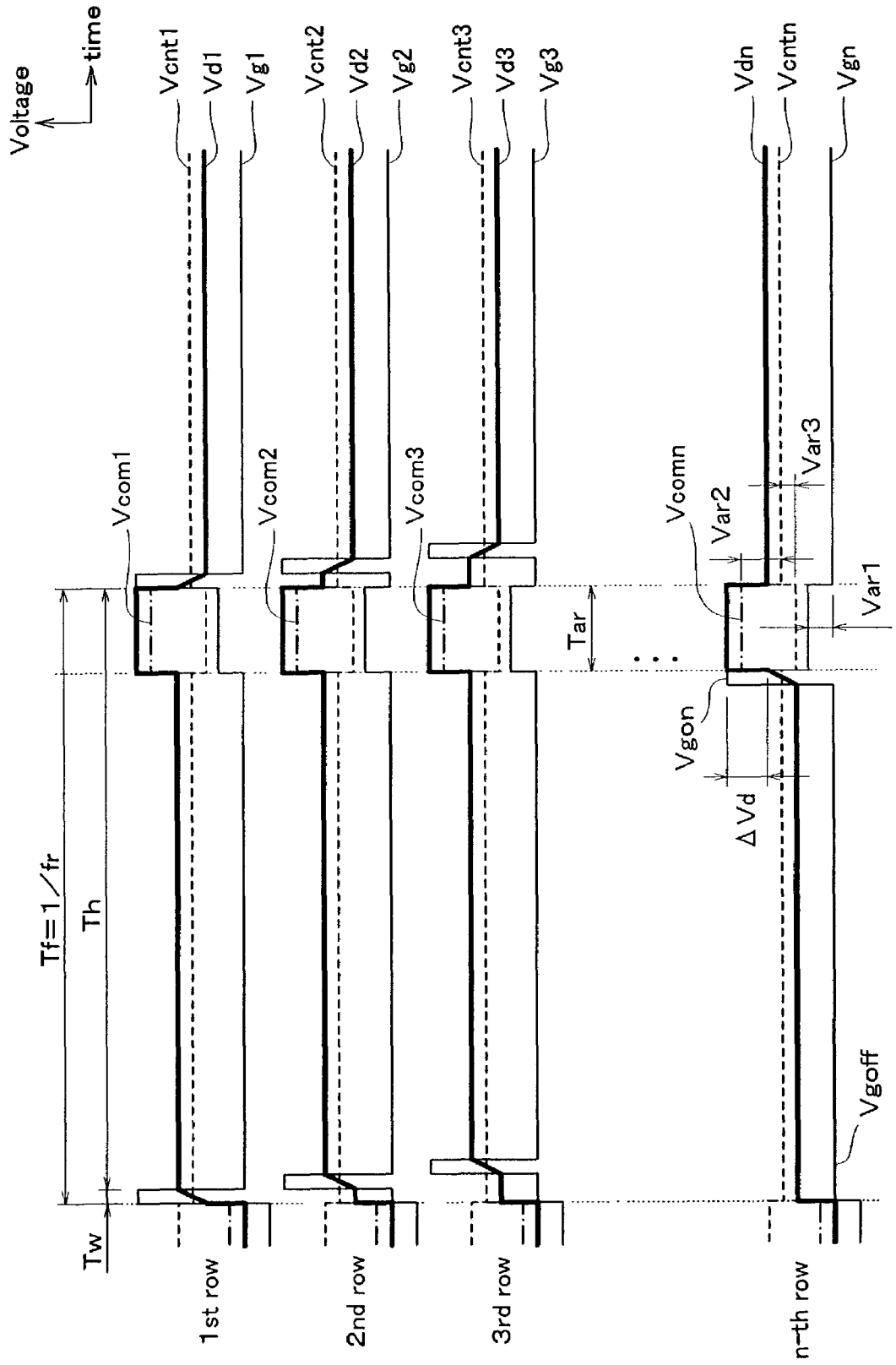
FIG. 24 is a waveform diagram showing change in gate signals, pixel voltages, counter voltages and common voltages in a liquid crystal display according to a tenth embodiment of the present invention.

FIG. 24 is a waveform diagram showing change in gate signals, pixel voltages, counter voltages and common voltages in a liquid crystal display according to a tenth embodiment of the present invention. In FIG. 24, the same reference numerals as those of FIGS. 9, 23 are used to indicate the same or corresponding parts. In FIG. 24, the common voltage Vcomx is set to a constant voltage equal to the counter voltage Vcntx except the superposing period Tar, and in FIG. 24, the common voltage Vcomx is indicated by a dashed line only during the superposing period Tar.

This embodiment is a combination of the third embodiment and the eighth embodiment. As indicated by the dotted line in FIG. 18, the clock signal 122 from the drive control 101 is input to the counter voltage control portion 106.

In the liquid crystal display 100 constituted as described above, as shown in FIGS. 18, 24, the gate driver 102 superposes the first superposed voltage Var1 on the gate signals Vg1–Vgn over the superposing period Tar set at the rear of the frame period Tf, the common voltage control portion 107 superposes the second superposed voltage Var2 on the common voltages Vcom1–Vcomn over the superposing period Tar, and the counter voltage control portion 106 superposes a third superposed voltage Var3 on the counter voltages Vcnt1–Vcntn over the superposing period Tar. This results in the liquid crystal application voltage superposed by the pixel electrode superposed voltage ΔVd due to the first and second superposed voltages Var1, Var2 and the third superposed voltage Var 3. By setting the voltage which is equal to the sum of the pixel electrode superposed voltage ΔVd and the third superposed voltage Var3 higher than |Vt–Vw| of FIGS. 6(c), 6(d), the backward transition of the liquid crystal layer 210 can be prevented. In this embodiment, since three superposed voltages, i.e., the first to third superposed voltages Var1–Var3 can be utilized as the backward-transition-prevention voltages, higher backward-transition-prevention voltage can be provided. Consequently, the superposing period Tar can be reduced.

Further, similarly to the ninth embodiment, the backlight luminance control portion 104 causes the backlight 105 to be darken during the superposing period Tar in accordance with the clock signal 121 from the drive control portion 101, thereby obtaining a display image with improved sharpness.

Similarly to the eighth embodiment, the superposing period Tar may be set to be located at a fixed position on time axis in the hold period Th.

In the second through tenth embodiments, if the superposing period accounts for 10% or more of the frame period Tf, then a favorable image display becomes possible, and if exceeding 50%, blurring in the moving images can be prevented, which has been already described in the first embodiment. Also, a normally black mode can be set.

In the second, and fourth through tenth embodiments, the polarities of the superposed voltages Var, Var1, Var2 of the gate signal Vgx and the common voltage Vcomx need not always coincide with the polarities of the source signals. Also, it is desirable that the positive and negative polarities of the all the superposed voltages Var, Var1, Var2 to be applied should be substantially equal in number. Further, there may be used a subsequent-stage type in which the storage capacitor is formed between the pixel electrode 2 and the gate line Gx+1 in subsequent stage.

In the third, fourth, seventh, ninth, and tenth embodiments, when the superposing period Tar of the counter voltage Vcntx is set at the fixed position on time axis in the frame period Tf, it is not necessary to independently control the respective counter voltages Vcntx. Therefore, the counter electrode Cntx need not be provided for each row of the pixels 1 but instead, one counter electrode may be provided over substantially the entire surface of the opposing substrate 201. As a matter of course, the same is the case with the first, second, fifth, sixth, and eighth embodiments.

In the first through tenth embodiments, the backward-transition-prevention voltage is superposed in each frame period. For example, when the frame frequency of the video signal is high, the backward-transition-prevention voltage may be superposed once in every plural frames.

Moreover, in the first through tenth embodiments, the TFT used as the switching device 10 may be replaced by a diode.

Numerous modifications and alternative embodiments of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention and all modifications which come within the scope of the appended claims are reserved.

INDUSTRIAL APPLICABILITY

A liquid crystal display of the preset invention is useful as a display portion of a liquid crystal television, a liquid crystal monitor, and a liquid crystal personal digital assistant.

A driving method of the liquid crystal display according to the present invention is useful as a driving method of the display portion of the liquid crystal television, the liquid crystal monitor, and the liquid crystal personal digital assistant.

The invention claimed is:
1. A liquid crystal display including a liquid crystal layer to which a voltage needs to be applied for preventing backward transition from an alignment state for display, to which an alignment state for non-display has transitioned, to the alignment state for non-display, and a plurality of pixels,
  in which video signals are written onto the plurality of pixels frame by frame, voltages corresponding to the video signals are held in the respective pixels, and a modulation degree of the liquid crystal layer in the alignment state for display is controlled in accordance with the held voltages, thereby displaying an image, the liquid crystal display being characterized by comprising:
  a backward-transition-prevention voltage superposing means for temporarily superposing a backward-transition-prevention voltage for preventing backward transition of the liquid crystal layer on the voltages corresponding to the video signals in a hold period during which the voltages corresponding to the video signals are held, and
  including a display portion with a pair of opposed substrates between which the liquid crystal layer is interposed, one of the substrates being provided with pixel electrodes corresponding to the plurality of pixels on an inner surface thereof and the other of the substrates being provided with counter electrodes on an inner surface thereof, wherein
  the voltages corresponding to the video signals are held by at least one of liquid crystal capacitors each formed between the pixel electrode and the counter electrode between which the liquid crystal layer is interposed, and
  the backward-transition-prevention voltage and a punch-through voltage are respectively superimposed on the voltages corresponding to the video signals, and the backward-transition-prevention voltage superposing means is adapted to superpose the backward-transition-prevention voltage on the voltages corresponding to the video signals through control capacitors formed by utilizing the pixel electrodes or conductors connected to the pixel electrodes, independently of the liquid crystal capacitors so as to increase absolute values of voltages between the pixel electrodes and the counter electrodes in respective frames.

2. The liquid crystal display according to claim 1, wherein the plurality of pixels are respectively provided with switching devices which are sequentially turned on or turned off through gate lines, for allowing the video signals to be written onto the respective pixels when the switching devices are turned on and the voltages corresponding to the written video signals to be held in the respective pixels when the switching devices are turned off, the control capacitors are each formed between the gate line and the pixel electrode, and predetermined voltages are superposed on the gate lines, thereby superposing the backward-transition-prevention voltage on the voltages corresponding to the video signals through the control capacitors.

3. The liquid crystal display according to claim 2, wherein the predetermined voltages superposed on the respective gate lines have opposite polarities.

4. The liquid crystal display according to claim 2, wherein when the backward-transition-prevention voltage is represented by $\Delta Vd$, capacitance of the liquid crystal capacitor is represented by $Clc$, capacitance of the control capacitor is represented by $Cst$, and parasitic capacitance of the switching device is represented by $Cgd$, the predetermined voltages superposed on the gate lines are given by:

$(Clc+Cst+Cgd)/Cst \times \Delta Vd$.

5. The liquid crystal display according to claim 2, wherein the plurality of pixels are arranged in matrix, the gate lines are formed for respective rows or columns of the plurality of pixels and source lines are formed for the respective columns or rows of the plurality of pixels, the respective pixels are connected to the corresponding source lines through the respective switching devices and control terminals of the switching devices are connected to the corresponding gate lines, and the video signals are supplied to the respective pixels through the source lines according to timings at which the switching devices of the respective pixels are sequentially turned on for the respective gate lines.

6. The liquid crystal display according to claim 5, wherein the predetermined voltage is superposed for each gate line.

7. The liquid crystal display according to claim 5, wherein the predetermined voltage is superposed for each set of plural gate lines.

8. The liquid crystal display according to claim 7, wherein the plural of gate lines correspond to continuous rows or columns of pixels.

9. The liquid crystal display according to claim 2, wherein the switching device is comprised of a thin film transistor.

10. The liquid crystal display according to claim 2, wherein the switching device is comprised of diode.

11. The liquid crystal display according to claim 2, further including common lines, wherein another control capacitors are each formed between the common line and the pixel electrode or a conductor connected to the pixel electrode, and another predetermined voltages are superposed on the common lines, thereby superposing another backward-transition-prevention voltage on the voltages corresponding to the video signals through the another control capacitors.

12. The liquid crystal display according to claim 11, wherein both of the backward-transition-prevention voltage and the another backward-transition-prevention voltage are superposed.

13. The liquid crystal display according to claim 11, wherein when the backward-transition-prevention voltage is represented by $\Delta Vd1$, the another backward-transition-prevention voltage is represented by $\Delta Vd2$, capacitance of the control capacitor is represented by $Cst1$, and capacitance of the another control capacitor is represented by $Cst2$, total backward-transition-prevention voltage $\Delta Vd$ superposed on the voltages corresponding to the video signals is given by:

$\Delta Vd = \Delta Vd1 + \Delta Vd2$, the predetermined voltages superposed on the gate lines are given by:

$(Clc+Cst1+Cgd)/Cst1 \times \Delta Vd1$, and another predetermined voltages superposed on the common lines are given by:

$(Clc+Cst2+Cgd)/Cst2 \times \Delta Vd2$.

14. The liquid crystal display according to claim 2, wherein at least one of the backward-transition-prevention voltage and the another backward-transition-prevention voltage is superposed.

15. The liquid crystal display according to claim 1, further including common lines, wherein the control capacitors are each formed between the common line and the pixel electrode or a conductor connected to the pixel electrode, and the predetermined voltages are superposed on the common lines, thereby superposing the backward-transition-prevention voltage on the voltages corresponding to the video signals through the control capacitors.

16. The liquid crystal display according to claim 15, wherein when the backward-transition-prevention voltage is represented by $\Delta Vd$, capacitance of the liquid crystal capacitor is represented by $Clc$, capacitance of the control capacitor is represented by $Cst$, and parasitic capacitance of the switching device is represented by $Cgd$, the predetermined voltages superposed on the common lines are given by:

$(Clc+Cst+Cgd)/Cst \times \Delta Vd$.

17. The liquid crystal display according to claim 16, wherein the common line is formed for each row or column of the pixels and the predetermined voltage is superposed for each common line.

18. The liquid crystal display according to claim 16, wherein the common line is formed for each row or column of the pixels and the predetermined voltage is superposed for each set of plural common lines.

19. The liquid crystal display according to claim 18, wherein the plural common lines correspond to continuous rows or columns of pixels.

20. The liquid crystal display according to claim 1, wherein display of the image is set in a normally-white mode and a voltage being applied to the liquid crystal layer while the backward-transition-prevention voltage is superposed is in a range including a black display voltage or greater.

21. The liquid crystal display according to claim 1, wherein display of the image is set in a normally-black mode and a voltage being applied to the liquid crystal layer while the backward-transition-prevention voltage is superposed is in a range including a white display voltage or greater.

22. The liquid crystal display according to claim 1, wherein the backward-transition-prevention voltage is greater than a difference voltage between a minimum value of the voltages corresponding to the video signals and a threshold voltage at which backward transition of the liquid crystal layer takes place.

23. The liquid crystal display according to claim 1, wherein a period during which the backward-transition-prevention voltage is superposed accounts for 10% or more of a frame period of the video signal.

24. The liquid crystal display according to claim 23, wherein the period during which the backward-transition-prevention voltage is superposed accounts for 50% or more of the frame period of the video signal.

25. The liquid crystal display according to claim 1, wherein the liquid crystal layer is made of OCB liquid crystal.

26. The liquid crystal display according to claim 1, wherein the backward-transition-prevention voltage is substantially not less than 1V.

27. A liquid crystal display including a liquid crystal layer to which a voltage needs to be applied for preventing backward transition from an alignment state for display, to which an alignment state for non-display has transitioned, to the alignment state for non-display, and a plurality of pixels,
  in which video signals are written onto the plurality of pixels frame by frame, voltages corresponding to the video signals are held in the respective pixels, and a modulation degree of the liquid crystal layer in the alignment state for display is controlled in accordance with the held voltages, thereby displaying an image, the liquid crystal display being characterized by comprising:
  a backward-transition-prevention voltage superposing means for temporarily superposing a backward-transition-prevention voltage for preventing backward transition of the liquid crystal layer on the voltages corresponding to the video signals in a hold period during which the voltages corresponding to the video signals are held, and
  including a display portion with a pair of opposed substrates between which the liquid crystal layer is interposed, one of the substrates being provided with pixel electrodes corresponding to the plurality of pixels on an inner surface thereof and the other of the substrates being provided with counter electrodes on an inner surface thereof, wherein
  the voltages corresponding to the video signals are held by at least one of liquid crystal capacitors each formed between the pixel electrode and the counter electrode between which the liquid crystal layer is interposed, and
  the backward-transition-prevention voltage and a punch-through voltage are respectively superimposed on the voltages corresponding to the video signals, and the backward-transition-prevention voltage superposing means is adapted to superpose the backward-transition-prevention voltage on the voltages corresponding to the video signals so as to increase absolute values of voltages between the pixel electrodes and the counter electrodes in respective frames by temporarily changing potentials of the counter electrodes.

28. The liquid crystal display according to claim 27, wherein the counter electrode is formed for each predetermined group of the plurality of pixels.

29. A liquid crystal display including a liquid crystal layer to which a voltage needs to be applied for preventing backward transition from an alignment state for display, to which an alignment state for non-display has transitioned, to the alignment state for non-display, and a plurality of pixels,
  in which video signals are written onto the plurality of pixels frame by frame, voltages corresponding to the video signals are held in the respective pixels, and a modulation degree of the liquid crystal layer in the alignment state for display is controlled in accordance with the held voltages, thereby displaying an image, the liquid crystal display being characterized by comprising:
  a backward-transition-prevention voltage superposing means for temporarily superposing a backward-transition-prevention voltage for preventing backward transition of the liquid crystal layer on the voltages corresponding to the video signals in a hold period during which the voltages corresponding to the video signals are held, and
  the backward-transition-prevention voltage and a punch-through voltage are respectively superimposed on the voltages corresponding to the video signals, and the backward-transition-prevention voltage is superposed over a superposing period located at a fixed position on time axis in a frame period of the video signal so as to increase absolute values of voltages between the pixel electrodes and the counter electrodes in respective frames.

30. The liquid crystal display according to claim 29, including an illuminating device for supplying display light for displaying an image by causing transmittance thereof to be changed in accordance with modulation degree of the liquid crystal layer, wherein
  the illuminating device is adapted to reduce a supply amount of the display light according to the superposing period.

31. The liquid crystal display according to claim 29, wherein the superposing period is located in a blanking period of the video signal.

32. A method of driving a liquid crystal display including a liquid crystal layer to which a voltage needs to be applied for preventing backward transition from an alignment state for display, to which an alignment state for non-display has transitioned, to the alignment state for non-display, and a plurality of pixels,
  in which video signals are written onto the plurality of pixels frame by frame, voltages corresponding to the video signals are held in the respective pixels, and a modulation degree of the liquid crystal layer in the alignment state for display is controlled in accordance with the held voltages, thereby displaying an image, the method being characterized by the step of:
  temporarily superposing a backward-transition-prevention voltage for preventing backward transition of the liquid crystal layer on the voltages corresponding to the video signals in a hold period during which the voltages corresponding to the video signals are held, wherein
  the liquid crystal display includes a display portion with a pair of opposed substrates between which the liquid crystal layer is interposed, one of the substrates being provided with pixel electrodes corresponding to the plurality of pixels on an inner surface thereof and the other of the substrates being provided with counter electrodes on an inner surface thereof,
  the voltages corresponding to the video signals are held by at least one of liquid crystal capacitors each formed between the pixel electrode and the counter electrode between which the liquid crystal layer is interposed, and the backward-transition-prevention voltage and a punch-through voltage are respectively superimposed on the voltages corresponding to the video signals, and the backward-transition-prevention voltage is superposed on the voltages corresponding to the video signals through control capacitors formed by utilizing the pixel electrodes or conductors connected to the pixel electrodes, independently of the liquid crystal capacitors so as to increase absolute values of voltages between the pixel electrodes and the counter electrodes in respective frames.

33. The method of driving the liquid crystal display according to claim 32, wherein the plurality of pixels are respectively provided with switching devices which are sequentially turned on or turned off through gate lines, for allowing the video signals to be written onto the respective pixels when the switching devices are turned on and the voltages corresponding to the written video signals to be held in the respective pixels when the switching devices are turned off, the control capacitors are each formed between the gate line and the pixel electrode, and predetermined voltages are superposed on the gate lines, thereby superposing the backward-transition-prevention voltage on the voltages corresponding to the video signals through the control capacitors.

34. The method of driving the liquid crystal display according to claim 33, wherein
the predetermined voltages superposed on the respective gate lines have opposite polarities.

35. The method of driving the liquid crystal display according to claim 33, wherein when the backward-transition-prevention voltage is represented by $\Delta Vd$, capacitance of the liquid crystal capacitor is represented by $Clc$, capacitance of the control capacitor is represented by $Cst$, and parasitic capacitance of the switching device is represented by $Cgd$, the predetermined voltages superposed on the gate lines are given by:

$$(Clc+Cst+Cgd)/Cst \times \Delta Vd.$$

36. The method of driving the liquid crystal display according to claim 33, wherein the plurality of pixels are arranged in matrix, the gate lines are formed for respective rows or columns of the plurality of pixels and source lines are formed for the respective columns or rows of the plurality of pixels, the respective pixels are connected to the corresponding source lines through the respective switching devices and control terminals of the switching devices are connected to the corresponding gate lines, and the video signals are supplied to the respective pixels through the source lines according to timings at which the switching devices of the respective pixels are sequentially turned on in the respective gate lines.

37. The method of driving the liquid crystal display according to claim 36, wherein the predetermined voltage is superposed for each gate line.

38. The method of driving the liquid crystal display according to claim 36, wherein the predetermined voltage is superposed for each set of plural gate lines.

39. The method of driving the liquid crystal display according to claim 38, wherein the plural gate lines correspond to continuous rows or columns of pixels.

40. The method of driving the liquid crystal display according to claim 33, wherein the switching device is comprised of a thin film transistor.

41. The method of driving the liquid crystal display according to claim 33, wherein the switching device is comprised of diode.

42. The method of driving the liquid crystal display according to claim 33, wherein the liquid crystal display further includes common lines, another control capacitors are each formed between the common line and the pixel electrode or a conductors connected to the pixel electrode, and another predetermined voltages are superposed on the common lines, thereby superposing another backward-transition-prevention voltages on the voltages corresponding to the video signals through the another control capacitors.

43. The method of driving the liquid crystal display according to claim 42, wherein at least one of the backward-transition-prevention voltage and the another backward-transition-prevention voltage is superposed.

44. The method of driving the liquid crystal display according to claim 42, wherein the backward-transition-prevention voltage and the another backward-transition-prevention voltage are superposed.

45. The method of driving the liquid crystal display according to claim 42, wherein when the backward-transition-prevention voltage is represented by $\Delta Vd1$, the another backward-transition-prevention voltage is represented by $\Delta Vd2$, capacitance of the control capacitor is represented by $Cst1$, and capacitance of the another control capacitor is represented by $Cst2$, total backward-transition-prevention voltage $\Delta Vd$ superposed on the voltages corresponding to the video signals is given by:

$$\Delta Vd = \Delta Vd1 + \Delta Vd2,$$

the predetermined voltages superposed on the gate lines are given by:

$$(Clc+Cst1+Cgd)/Cst1 \times \Delta Vd1,$$

and another predetermined voltages superposed on the common lines are given by:

$$(Clc+Cst2+Cgd)/Cst2 \times \Delta Vd2.$$

46. The method of driving the liquid crystal display according to claim 32, wherein the liquid crystal display further includes common lines, wherein the control capacitors are each formed between the common line and the pixel electrode or a conductor connected to the pixel electrode, and the predetermined voltages are superposed on the common lines, thereby superposing the backward-transition-prevention voltage on the voltages corresponding to the video signals through the control capacitors.

47. The method of driving the liquid crystal display according to claim 46, wherein when the backward-transition-prevention voltage is represented by $\Delta Vd$, capacitance of the liquid crystal capacitor is represented by $Clc$, capacitance of the control capacitor is represented by $Cst$, and parasitic capacitance of the switching device is represented by $Cgd$, the predetermined voltages superposed on the gate lines are given by:

$$(Clc+Cst+Cgd)/Cst \times \Delta Vd.$$

48. The method of driving the liquid crystal display according to claim 47, wherein the common line is formed for each row or column of the pixels and the predetermined voltage is superposed for each common line.

49. The method of driving the liquid crystal display according to claim 47, wherein the common line is formed for each row or column of the pixels and the predetermined voltage is superposed for each set of plural common lines.

50. The method of driving the liquid crystal display according to claim 49, wherein the plural common lines correspond to continuous rows or columns of pixels.

51. The method of driving the liquid crystal display according to claim 32, wherein display of the image is set in a normally-white mode and a voltage being applied to the liquid crystal layer while the backward-transition-prevention voltage is superposed is in a range including a black display voltage or greater.

52. The method of driving the liquid crystal display according to claim 32, wherein display of the image is set in a normally-black mode and a voltage being applied to the liquid crystal layer while the backward-transition-prevention voltage is superposed is in a range including a white display voltage or greater.

53. The method of driving the liquid crystal display according to claim 32, wherein the backward-transition-prevention voltage is greater than a difference voltage between a minimum value of the voltages corresponding to the video signals and a threshold voltage at which backward transition of the liquid crystal layer takes place.

54. The method of driving the liquid crystal display according to claim 32, wherein a period during which the backward-transition-prevention voltage is superposed accounts for 10% or more of a frame period of the video signal.

55. The method of driving the liquid crystal display according to claim 54, wherein the period during which the backward-transition-prevention voltage is superposed accounts for 50% or more of the frame period of the video signal.

56. The method of driving the liquid crystal display according to claim 32, wherein the liquid crystal layer is made of OCB liquid crystal.

57. The liquid crystal display according to claim 32, wherein the backward-transition-prevention voltage is substantially not less than 1V.

58. A method of driving a liquid crystal display including a liquid crystal layer to which a voltage needs to be applied for preventing backward transition from an alignment state for display, to which an alignment state for non-display has transitioned, to the alignment state for non-display, and a plurality of pixels,
in which video signals are written onto the plurality of pixels frame by frame, voltages corresponding to the video signals are held in the respective pixels, and a modulation degree of the liquid crystal layer in the alignment state for display is controlled in accordance with the held voltages, thereby displaying an image, the method being characterized by the step of:
temporarily superposing a backward-transition-prevention voltage for preventing backward transition of the liquid crystal layer on the voltages corresponding to the video signals in a hold period during which the voltages corresponding to the video signals are held, wherein
the liquid crystal display includes a display portion with a pair of opposed substrates between which the liquid crystal layer is interposed, one of the substrates being provided with pixel electrodes corresponding to the plurality of pixels on an inner surface thereof and the other of the substrates being provided with counter electrodes on an inner surface thereof
the voltages corresponding to the video signals are held by at least one of liquid crystal capacitors each formed between the pixel electrode and the counter electrode between which the liquid crystal layer is interposed, and
the backward-transition-prevention voltage and a punch-through voltage are respectively superimposed on the voltages corresponding to the video signals, and the backward-transition-prevention voltage is superposed on the voltages corresponding to the video signals so as to increase absolute values of voltages between the pixel electrodes and the counter electrodes in respective frames by temporarily changing potentials of the counter electrodes.

59. The method of driving the liquid crystal display according to claim 58, wherein the counter electrode is formed for each predetermined group of pixels.

60. A method of driving a liquid crystal display including a liquid crystal layer to which a voltage needs to be applied for preventing backward transition from an alignment state for display, to which an alignment state for non-display has transitioned, to the alignment state for non-display, and a plurality of pixels, in which video signals are written onto the plurality of pixels frame by frame, voltages corresponding to the video signals are held in the respective pixels, and a modulation degree of the liquid crystal layer in the alignment state for display is controlled in accordance with the held voltages, thereby displaying an image, the method being characterized by the step of:
temporarily superposing a backward-transition-prevention voltage for preventing backward transition of the liquid crystal layer on the voltages corresponding to the video signals in a hold period during which the voltages corresponding to the video signals are held, wherein
the backward-transition-prevention voltage and a punch-through voltage are respectively superimposed on the voltages corresponding to the video signals, and the backward-transition-prevention voltage is superposed over a superposing period located at a fixed position on time axis in a frame period of the video signal so as to increase absolute values of voltages between the pixel electrodes and the counter electrodes in respective frames.

61. The method of driving the liquid crystal display according to claim 60, wherein the liquid crystal display further includes an illuminating device for supplying display light for displaying an image by causing transmittance of the liquid crystal layer to be changed in accordance with modulation degree of the liquid crystal layer, wherein
the illuminating device is adapted to reduce a supply amount of the display light according to the superposing period.

62. The method of driving the liquid crystal display according to claim 60, wherein the superposing period is located in a blanking period of the video signal.

* * * * *